Sept. 20, 1966  G. T. PAUL ETAL  3,274,556
LARGE SCALE SHIFTER
Filed July 10, 1962  23 Sheets-Sheet 1
FIG. 1
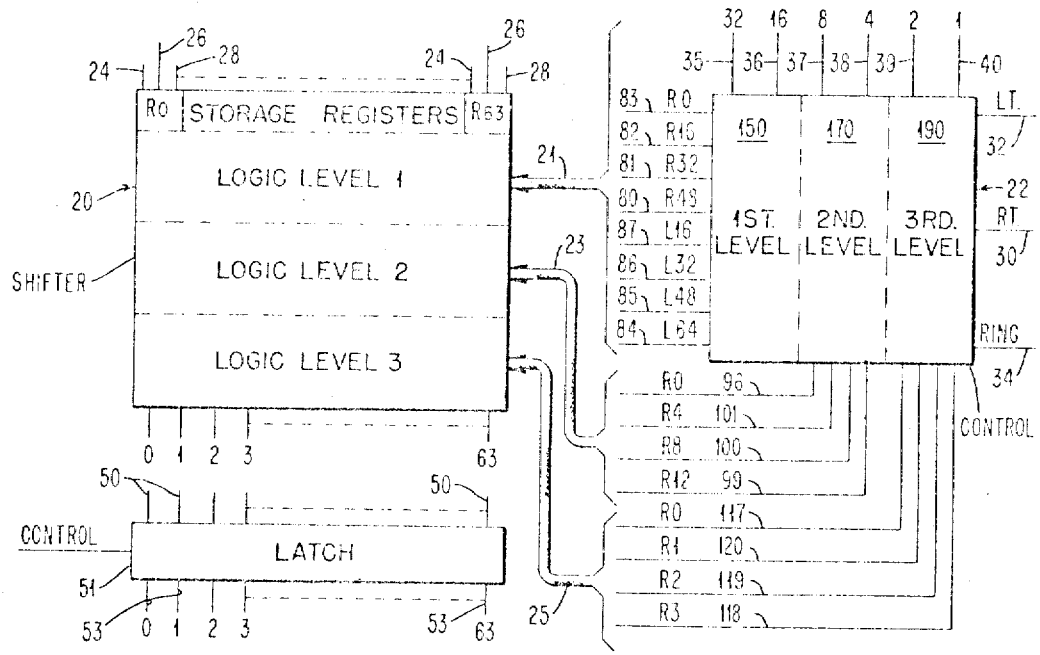
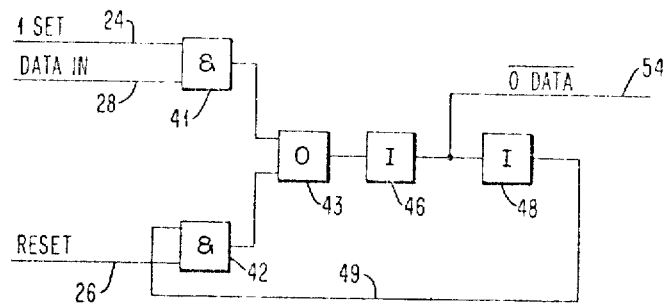
FIG. 2
INVENTORS
GERARD T. PAUL
JULES F. DIRAC
GENE M. AMDAHL
BY *Joseph C. Redmond, Jr.*
ATTORNEY

| FIG. 3 | FIG.3A | FIG.3B | FIG.3C |
| --- | --- | --- | --- |
| | FIG.3D | FIG.3E | FIG.3F |
| | FIG.3G | FIG.3H | FIG.3I |
| | FIG.3J | FIG.3K | FIG.3L |
| | FIG.3M | FIG.3N | FIG.3P |

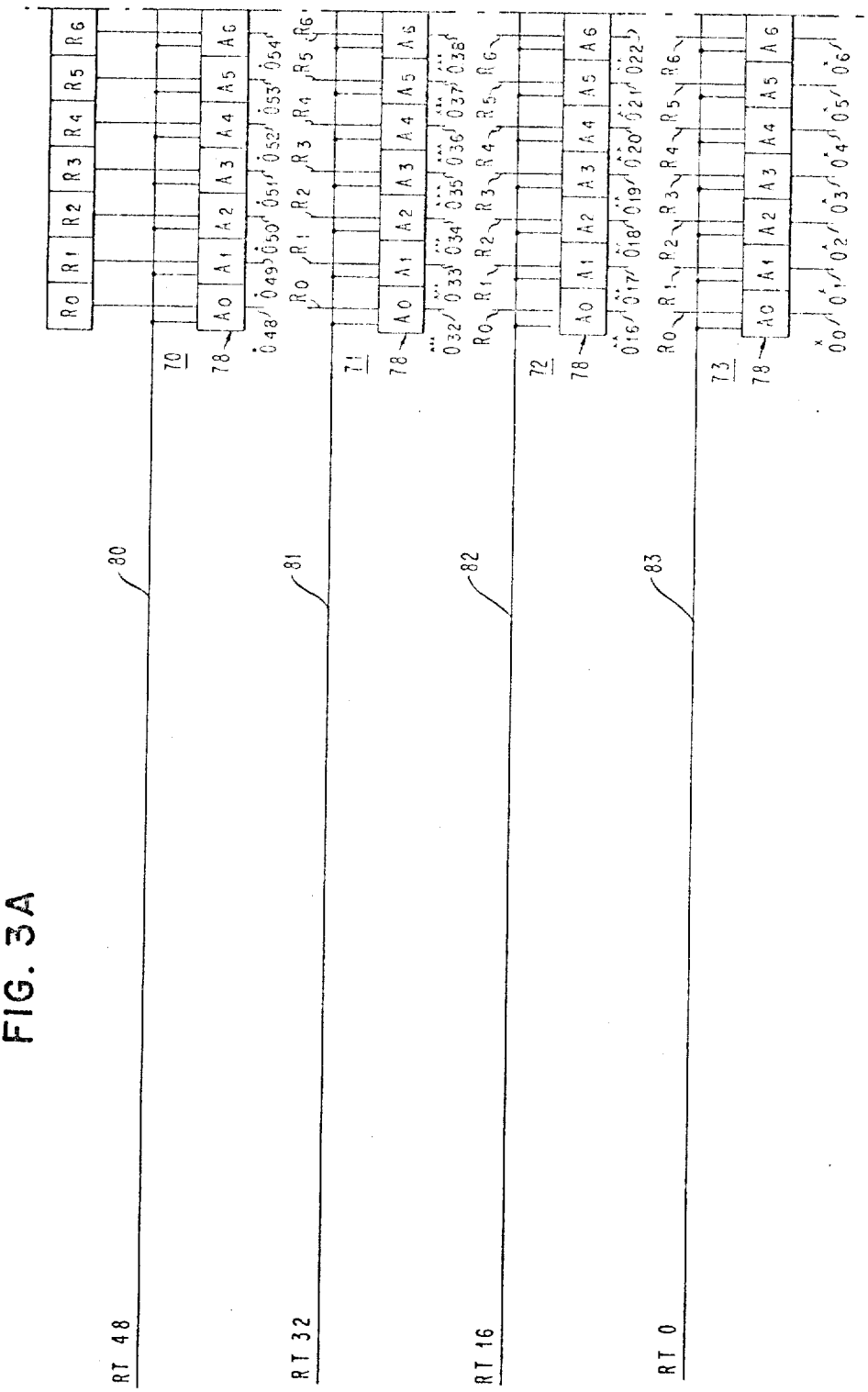

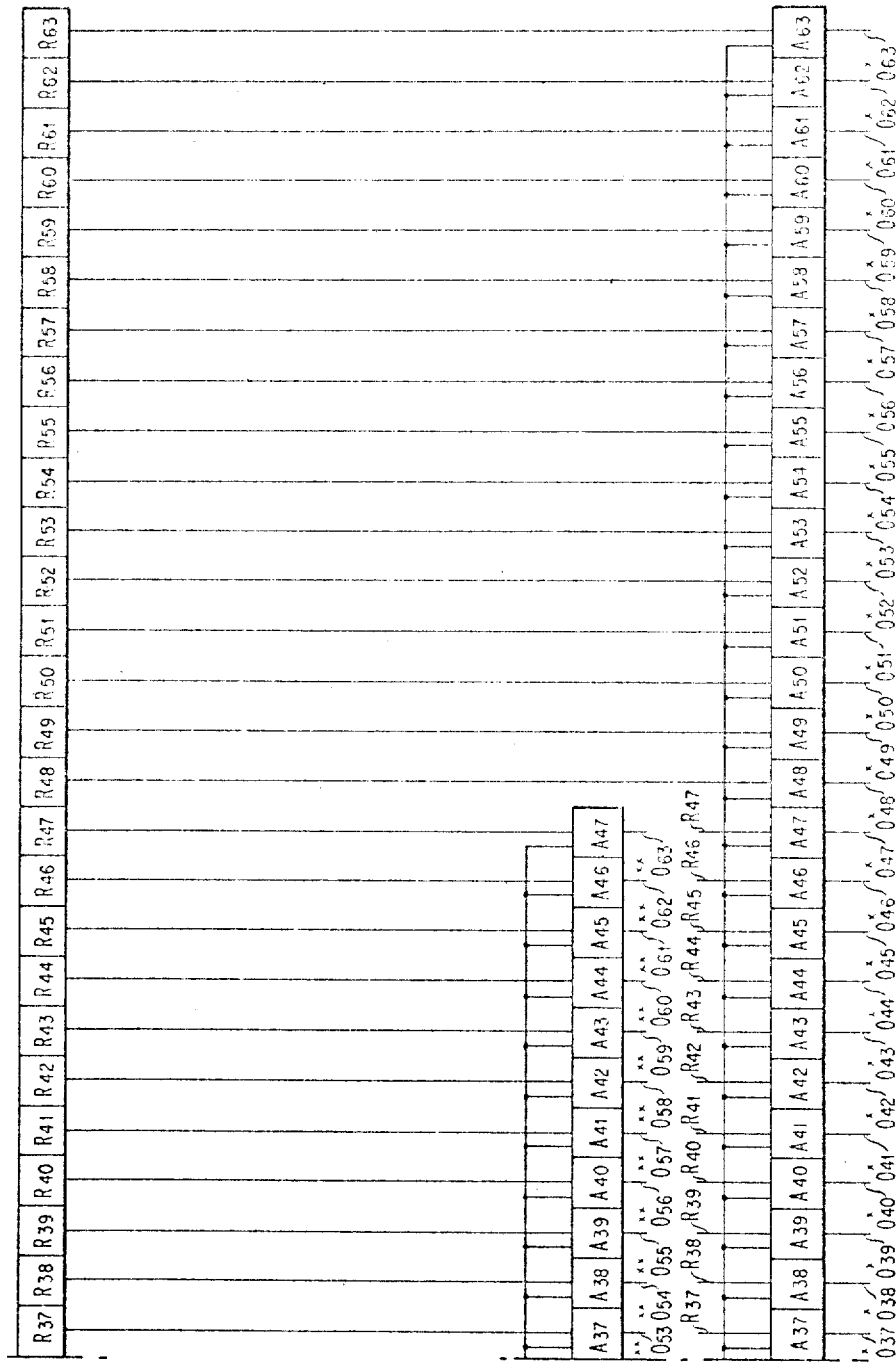

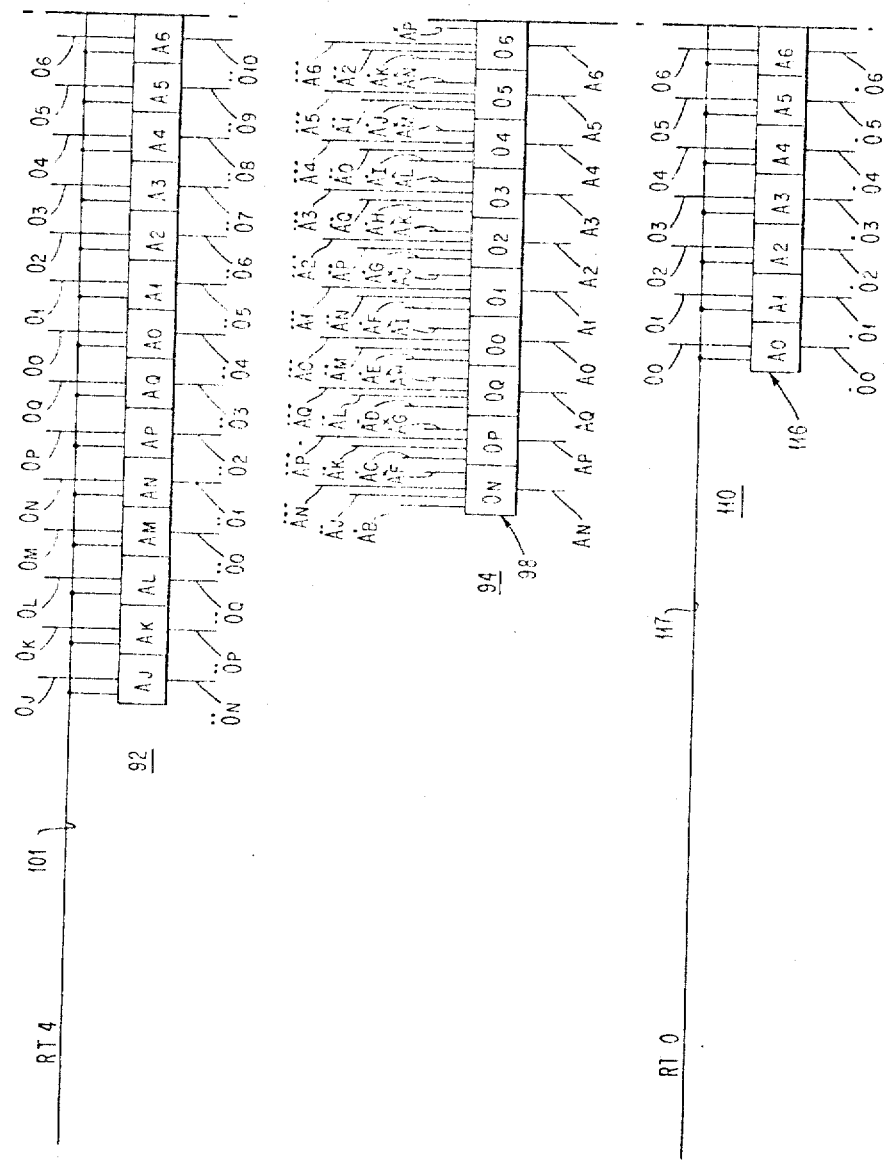

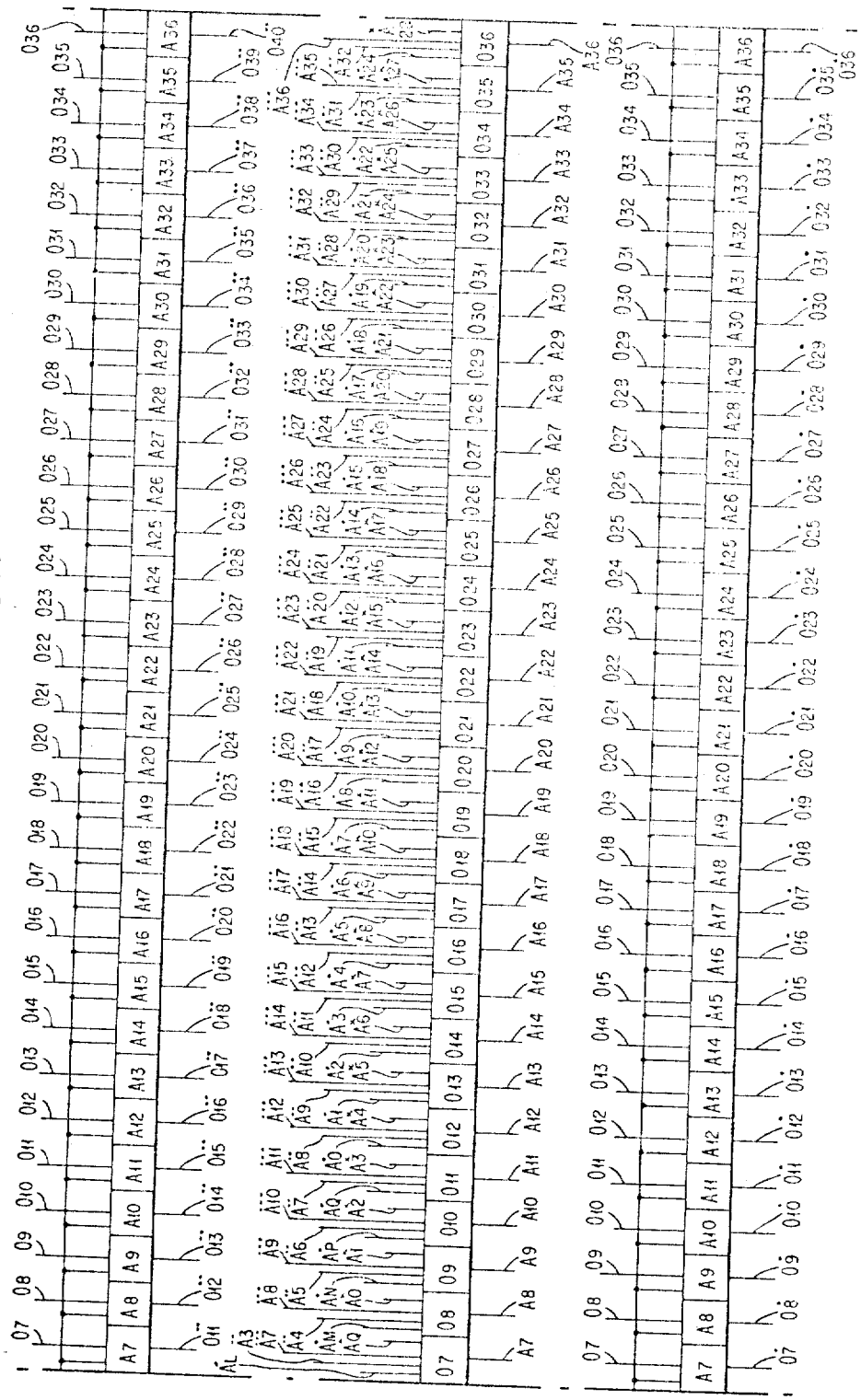

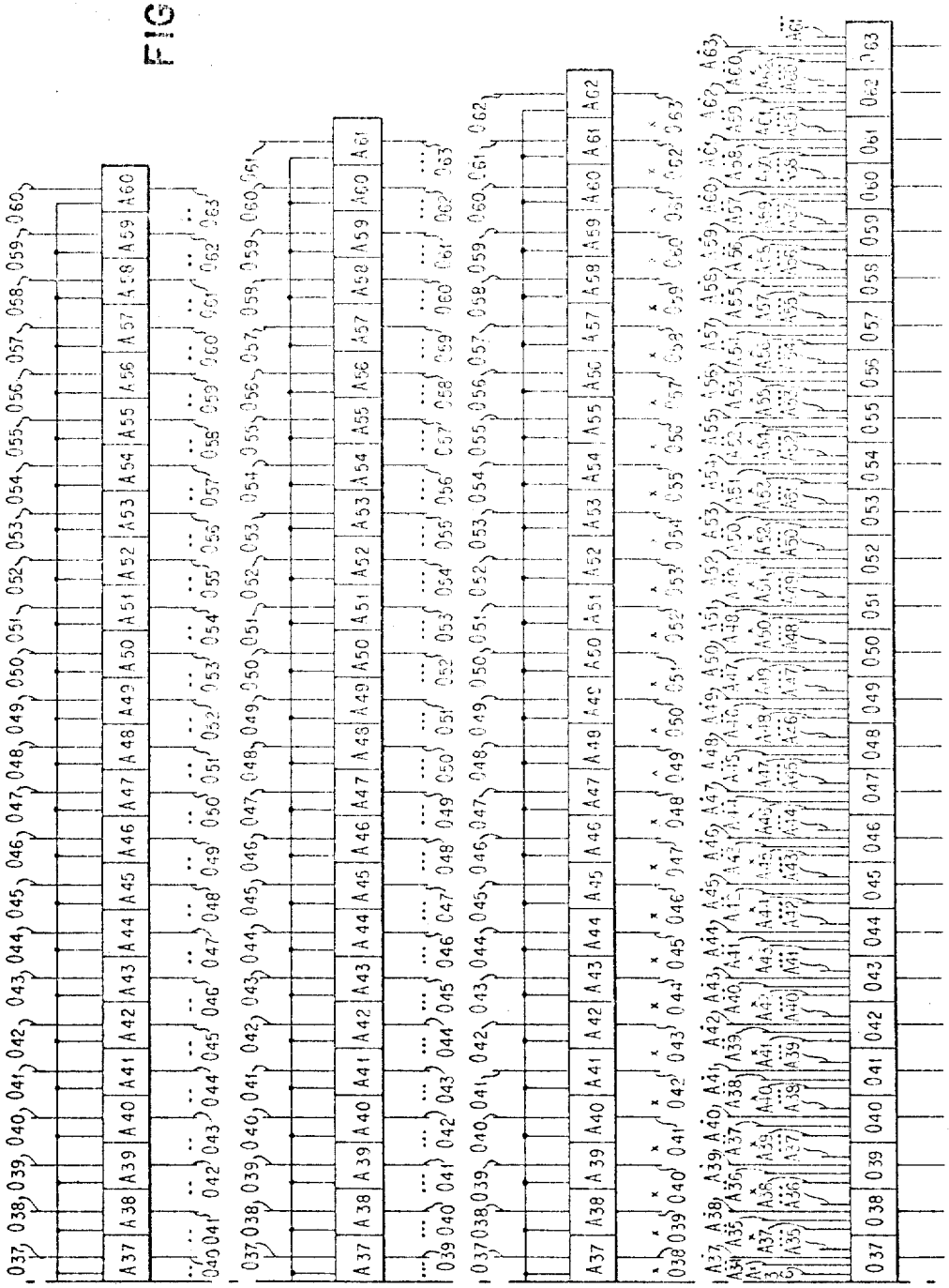

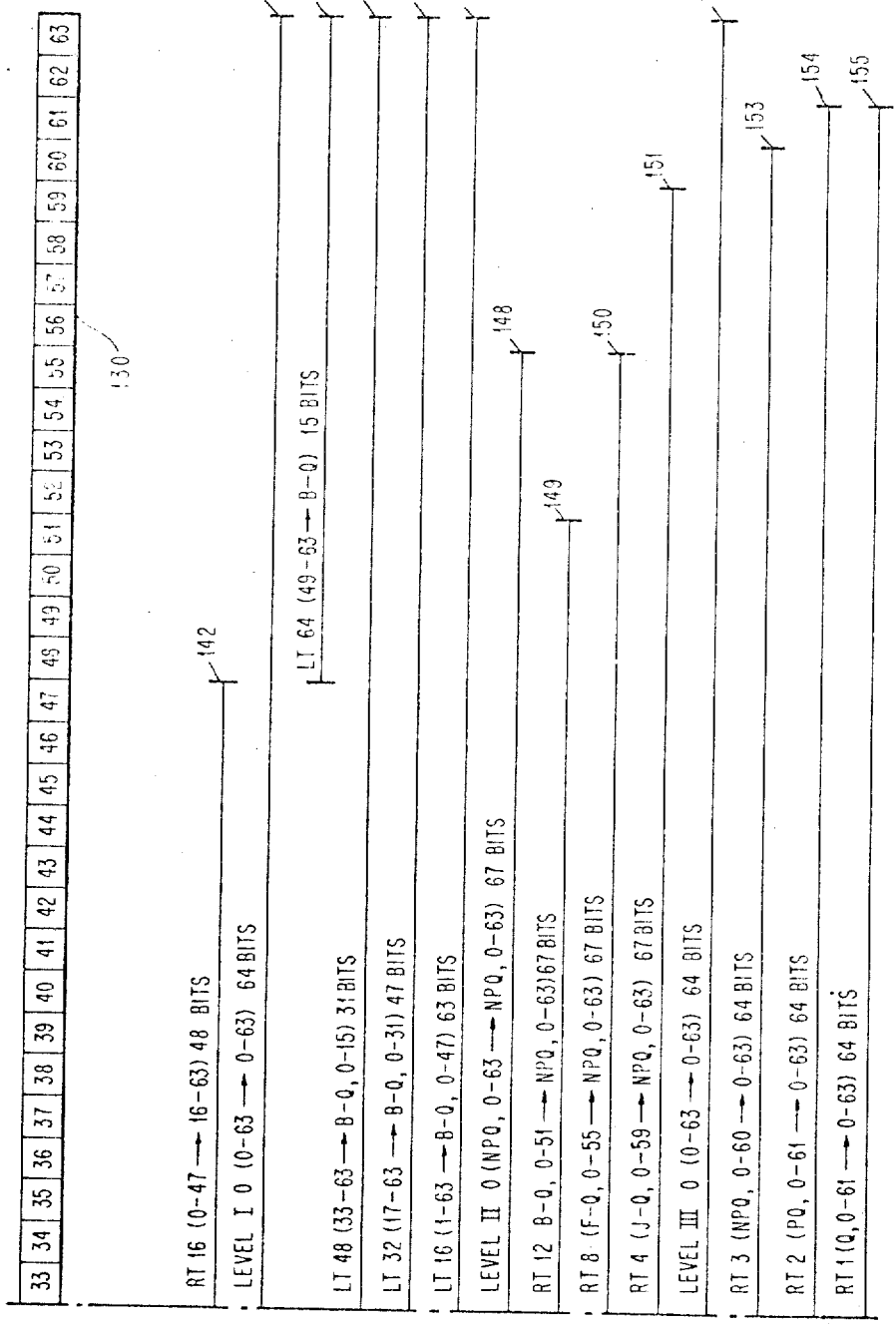

FIG. 5

1ST LEVEL CONTROL

A)            $32 \cdot 16 \cdot RT = RT\,48$

B)            $32 \cdot \overline{16} \cdot RT = RT\,32$

C)            $\overline{32} \cdot 16 \cdot RT = RT\,16$

D)            $\overline{32} \cdot \overline{16} \cdot RT = RT\,0$

E)   $(\bar{8}\,\bar{4}\,\bar{2}\,\bar{1})$   $32 \cdot 16 \cdot LT = LT\,48$

F)       "        $32 \cdot \overline{16} \cdot LT = LT\,32$

G)       "        $\overline{32} \cdot 16 \cdot LT = LT\,16$

H)       "        $\overline{32} \cdot \overline{16} \cdot LT = LT\,0$

I)   $(8+4+2+1)$   $32 \cdot 16 \cdot LT = LT\,64$

J)       "        $32 \cdot \overline{16} \cdot LT = LT\,48$

K)       "        $\overline{32} \cdot 16 \cdot LT = LT\,32$

L)       "        $\overline{32} \cdot \overline{16} \cdot LT = LT\,16$

M)   $RING \cdot LT\,64 = RT\,0$

N)      "    $\cdot LT\,48 = RT\,16$

O)      "    $\cdot LT\,32 = RT\,32$

P)      "    $\cdot LT\,16 = RT\,48$

Q)

R)   $RING \cdot RT\,0 = LT\,64$

S)      "    $\cdot RT\,16 = LT\,48$

T)      "    $\cdot RT\,32 = LT\,32$

U)      "    $\cdot RT\,48 = LT\,16$

V)

2ND LEVEL CONTROL $8 \cdot 4 \cdot RT = RT\,12$ $8 \cdot \bar{4} \cdot RT = RT\,8$ $\bar{8} \cdot 4 \cdot RT = RT\,4$ $\bar{8} \cdot \bar{4} \cdot RT = RT\,0$ $(\bar{2}\,\bar{1})$   $8 \cdot 4 \cdot LT = RT\,4$ "    $8 \cdot \bar{4} \cdot LT = RT\,8$ "    $\bar{8} \cdot 4 \cdot LT = RT\,12$ "    $\bar{8} \cdot \bar{4} \cdot LT = RT\,0$ $(1+2)$   $8 \cdot 4 \cdot LT = RT\,0$ "    $8 \cdot \bar{4} \cdot LT = RT\,4$ "    $\bar{8} \cdot 4 \cdot LT = RT\,8$ "    $\bar{8} \cdot \bar{4} \cdot LT = RT\,12$

3RD LEVEL CONTROL $RT \cdot 2 \cdot 1 = RT\,3$ $RT \cdot 2 \cdot \bar{1} = RT\,2$ $RT \cdot \bar{2} \cdot 1 = RT\,1$ $RT \cdot \bar{2} \cdot \bar{1} = RT\,0$ $LT \cdot 2 \cdot 1 = RT\,1$ $LT \cdot 2 \cdot \bar{1} = RT\,2$ $LT \cdot \bar{2} \cdot 1 = RT\,3$ $LT \cdot \bar{2} \cdot \bar{1} = RT\,0$

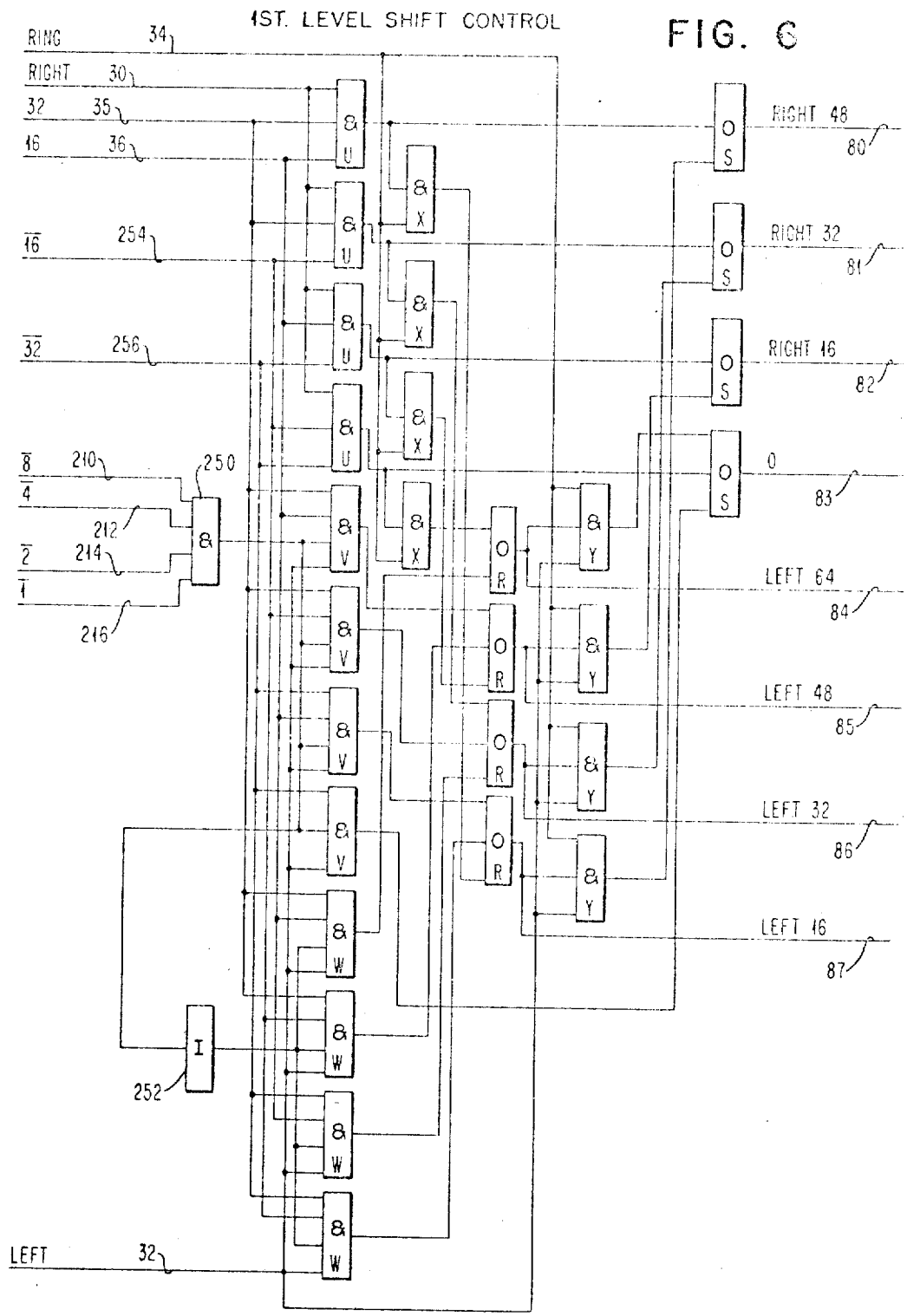

FIG. 7A 2ND. LEVEL SHIFT CONTROL
FIG. 7B 3RD. LEVEL SHIFT CONTROL
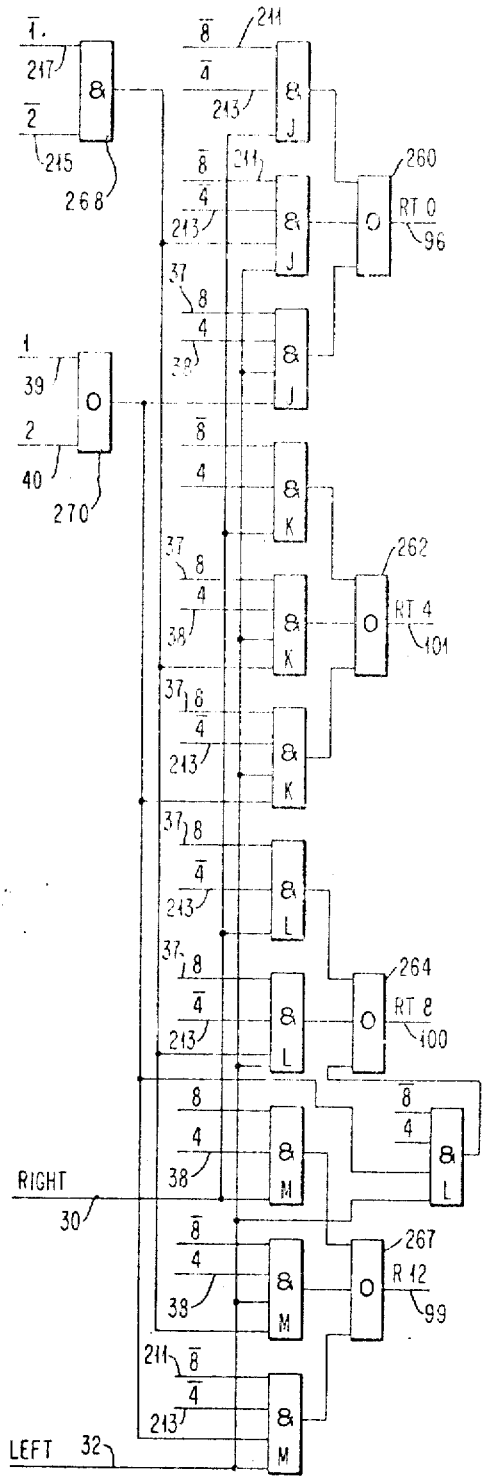
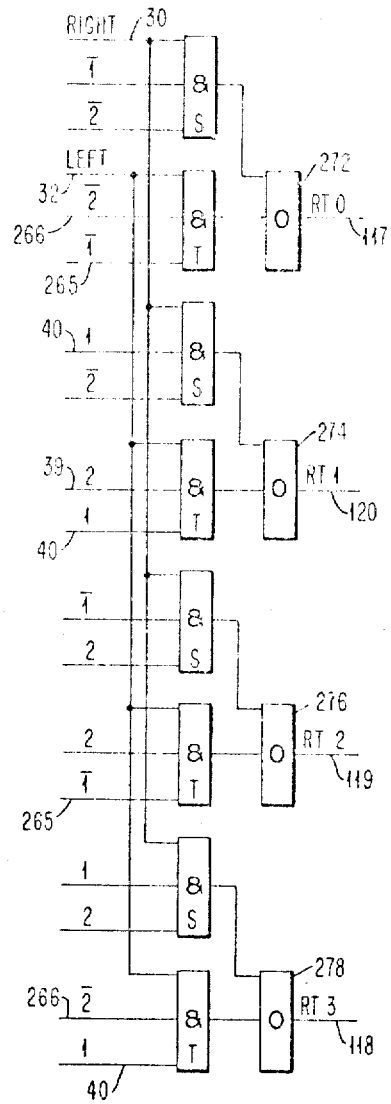

FIG. 8

|  | INPUT | | | | | | | | | CONTROL SET | | |
|---|---|---|---|---|---|---|---|---|---|---|---|---|
|  | 32 | 16 | 8 | 4 | 2 | 1 | R | L | RING | 21 | 22 | 23 |
| a. RT 53 | 1 | 1 | 0 | 1 | 0 | 1 | 1 | 0 | 0 | R48 | R4 | R1 |
| b. LT 29 | 0 | 1 | 1 | 1 | 0 | 1 | 0 | 1 | 0 | L32 | R0 | R3 |
| c. RIGHT RING 19 | 0 | 1 | 0 | 0 | 1 | 1 | 1 | 1 | 1 | RT16-LT48 | 0 | 3 |
| d. LT RING 43 | 1 | 0 | 1 | 0 | 1 | 1 | 0 | 1 | 1 | LT48-RT16 | 4 | 1 |
| CONTROL INPUT LINES | 35 | 36 | 37 | 38 | 39 | 40 | 30 | 32 | 34 | | | |

United States Patent Office 3,274,556
Patented Sept. 20, 1966

3,274,556
LARGE SCALE SHIFTER
Gerard T. Paul, Jules F. Dirac, and Gene M. Amdahl, Poughkeepsie, N.Y., assignors to International Business Machines Corporation, New York, N.Y., a corporation of New York
Filed July 10, 1962, Ser. No. 208,845
14 Claims. (Cl. 340—172.5)

This invention relates to information handling apparatus and, more particularly, to apparatus with a plurality of degrees of freedom for shifting information any desired direction and in any desired amount within the apparatus.

Present day information processing systems are required to manipulate large quantities of data as expeditiously as possible in order to fulfill the performance requirements of such systems. Information handling apparatus for manipulating data with such systems, e.g., shifters, as a consequence, must be versatile, reliable, simple in construction, rapid in operation and low in cost. Apparatus for shifting large quantities of datum in any direction and in any quantities normally requires complicated and expensive circuitry to perform the various data handling operations. Such complicated circuitry naturally imputes a relatively large number of logical stages which in turn reduces the operating speed of the data handling apparatus and increases the cost. Since the trend of commercial information processing systems is toward large capacity machines, it is desirable to improve the data handling apparatus within such systems so that data handling will be accomplished with a minimum of logical circuitry and consequently, as expeditiously as possible, thereby rendering the systems more useful and economically available to the business and scientific communities.

A general object of the present invention is a versatile data handling device providing a multiplicity of transfer operations with minimum signal delay and employing combinatorial logical elements for reliable operation and simplicity of construction.

One object is a data handling device adapted to provide right, left or ring shift operations.

Another object is a data handling device having minimum logical circuitry for providing the various shifting operations.

Another object is a data handling device that is easy to fabricate and low in cost.

Still another object is a data handling device with substantially reduced skew.

These and other objects are accomplished in accordance with the present invention one illustrative embodiment of which comprises a data storage register that cooperates with a plurality of combinatorial logic levels, each level being suitably regulated by a control unit responsive to input signals which select the desired direction and amount of data to be manipulated within the register. The input signal to the control unit is subdivided into a separate transfer instruction for each logic level so that the data stored in the register, when released by a clock signal, will flow through the logic levels in a unique manner to complete the direction and transfer instructions supplied by the input signal. The transfer instruction to each level is a binary division of the input signal and when executed by the respective levels algebraically combine the data to reproduce the input signal in a plural level logic system. Each logic level has a different degree of transfer ability and the relative abilities establish coarse, medium and fine verniers. The coarse logic level is provided with one more degree of transfer freedom than the medium and fine levels thereby to simplify the circuitry of the medium and fine logic levels. The additional degree of transfer freedom overshifts the transfer of data in one direction so that the medium and fine levels may correct the overshift by a single degree of transfer freedom in the opposite direction to the overshift. A ring transfer is accomplished by supplying plural instructions to the coarse level to transfer data in opposite directions and thereafter employing the single transfer freedom of the medium and fine levels to modify the transfers of the coarse level.

One feature of the invention is coarse, medium and fine transfer stages or logic levels adapted to handle data successively in a single clock cycle of a data processing system, the transfers among the levels being of different amounts according to a set of instructions supplied to the levels so that the combination of transfers provides a desired degree of data transfer.

Another feature is a plurality of logic levels and a data collecting means associated with each level, said levels being arranged in serial relation and each level including a plurality of logic stages with the different stages connected to the data collecting means.

Another feature is a plurality of storage registers connected to a plurality of logic levels, each level including a plurality of logic stages, the first level being adapted to transfer data in two directions simultaneously to effect a ring shift and the remaining levels being adapted to correct the ring shift to provide the desired degree of data ring shift.

Another feature is employing one logic level to overshift input data when a transfer is desired and employing the other stages to correct the overshift so that only one logic level requires more than one degree of freedom when data is transferred.

Still another feature is the use of simple AND/OR gating circuits in the logic levels so that fabrication of the apparatus is simplified thereby minimizing the cost thereof.

Still another feature is arranging the logic circuits for uniform loading so that skew is substantially reduced and operating speed is increased.

A specific feature is a plurality of storage registers, each register connected through a first plurality of data transmitting paths to a first plurality of data collecting means corresponding in part to the storage registers, said paths being adapted to connect the registers to the same or different points in the data collecting means as in the storage register, said first plurality of data collecting means being connected through a second plurality of data transmitting paths to a second plurality of data collecting means corresponding in part to the first plurality of data collecting means, said paths being adapted to connect the first plurality of data collecting means to the same or different points in the second data collecting means as in the first data collecting means, said second plurality of data collecting means being connected through a third plurality of data transmitting paths to a third plurality of data collecting means corresponding in part to the second plurality of data collecting means, said third plurality of data transmitting paths being adapted to connect the second collecting means to the same or different points in the third data collecting means of the third plurality, the combination of interconnections in effect connecting the storage registers to any one of the third plurality of data collecting means through several alternate data transmitting paths of the first, second and third levels of logic, respectively.

The foregoing and other objects, features and advantages of the invention will be apparent from the following more particular description of the preferred embodiment of the invention, as illustrated in the accompanying drawings.

FIGURE 1 is a block diagram of a data transfer device and a control unit employed in the present invention.

FIGURE 2 is an electrical schematic of a register circuit employed in the device shown in FIGURE 1.

FIGURE 5 is a tabulation of the logic performed by the control unit shown in FIGURE 1.

FIGURE 6 is an electrical schematic of the first level shift control of the control unit shown in FIGURE 1.

FIGURE 7A is an electrical schematic of the second level shift control of the control unit shown in FIGURE 1.

FIGURE 7B is an electrical schematic of the third level shift control of the control unit shown in FIGURE 1.

FIGURE 8 is a tabulation of typical input instructions to the control unit shown in FIGURE 1.

Figures 3, 3D:
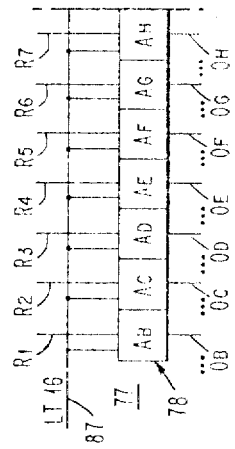
FIGURE 3 is a composite of FIGURES 3A through 3P which are an electrical schematic of the logic levels and the interconnections thereamong in the transfer device shown in FIGURE 1.
Figure 3B:
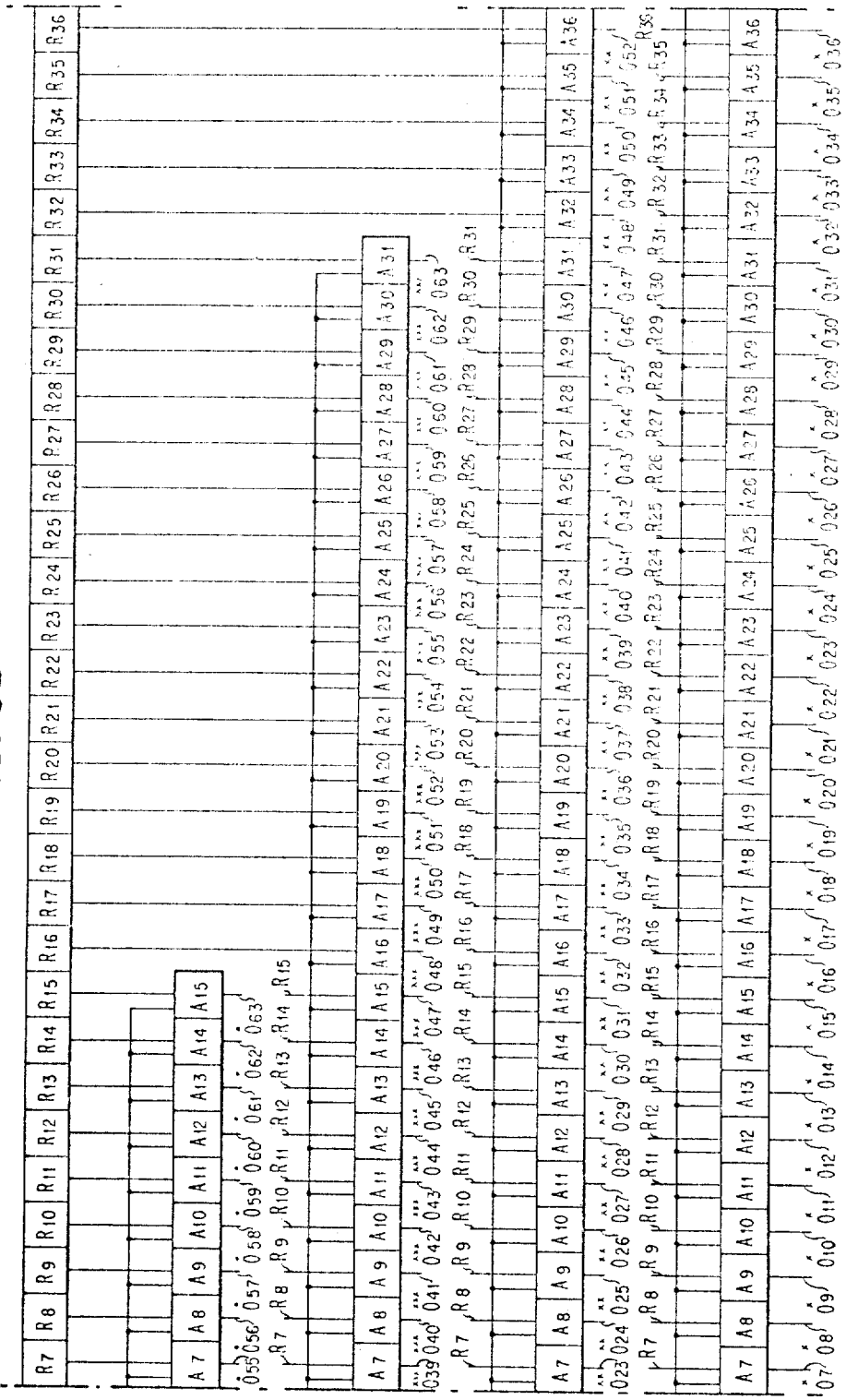
Figure 3E:
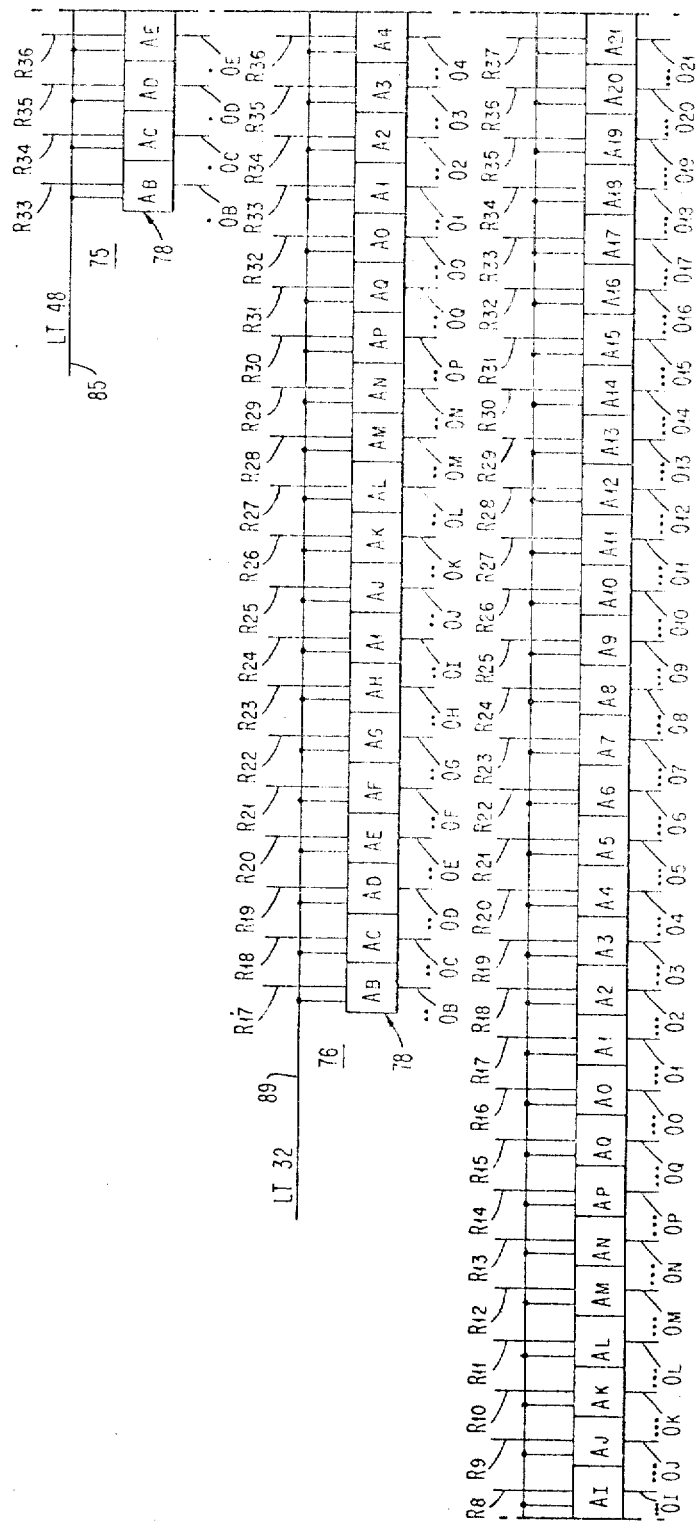
Figure 3F:
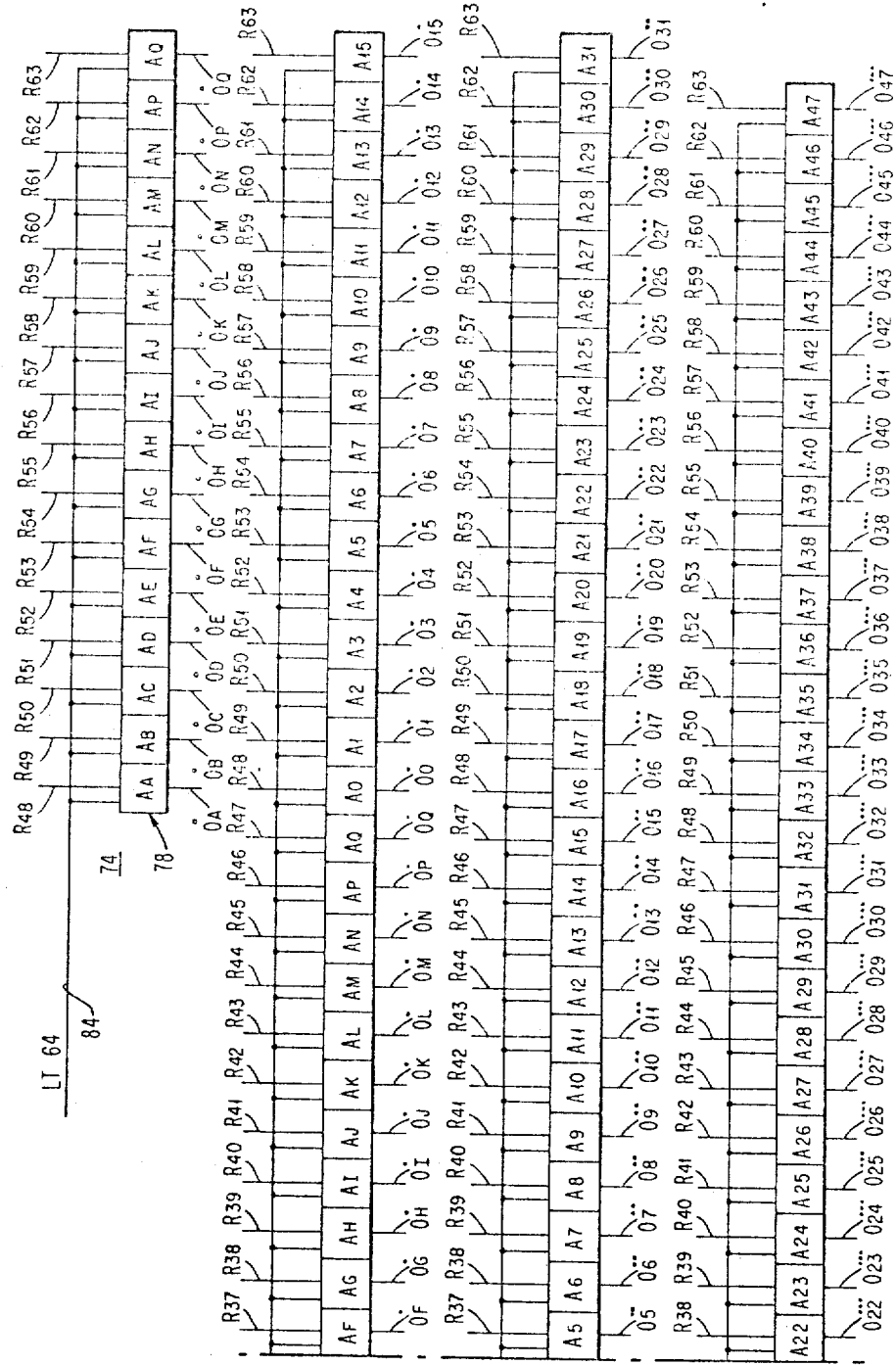
Figure 3G:
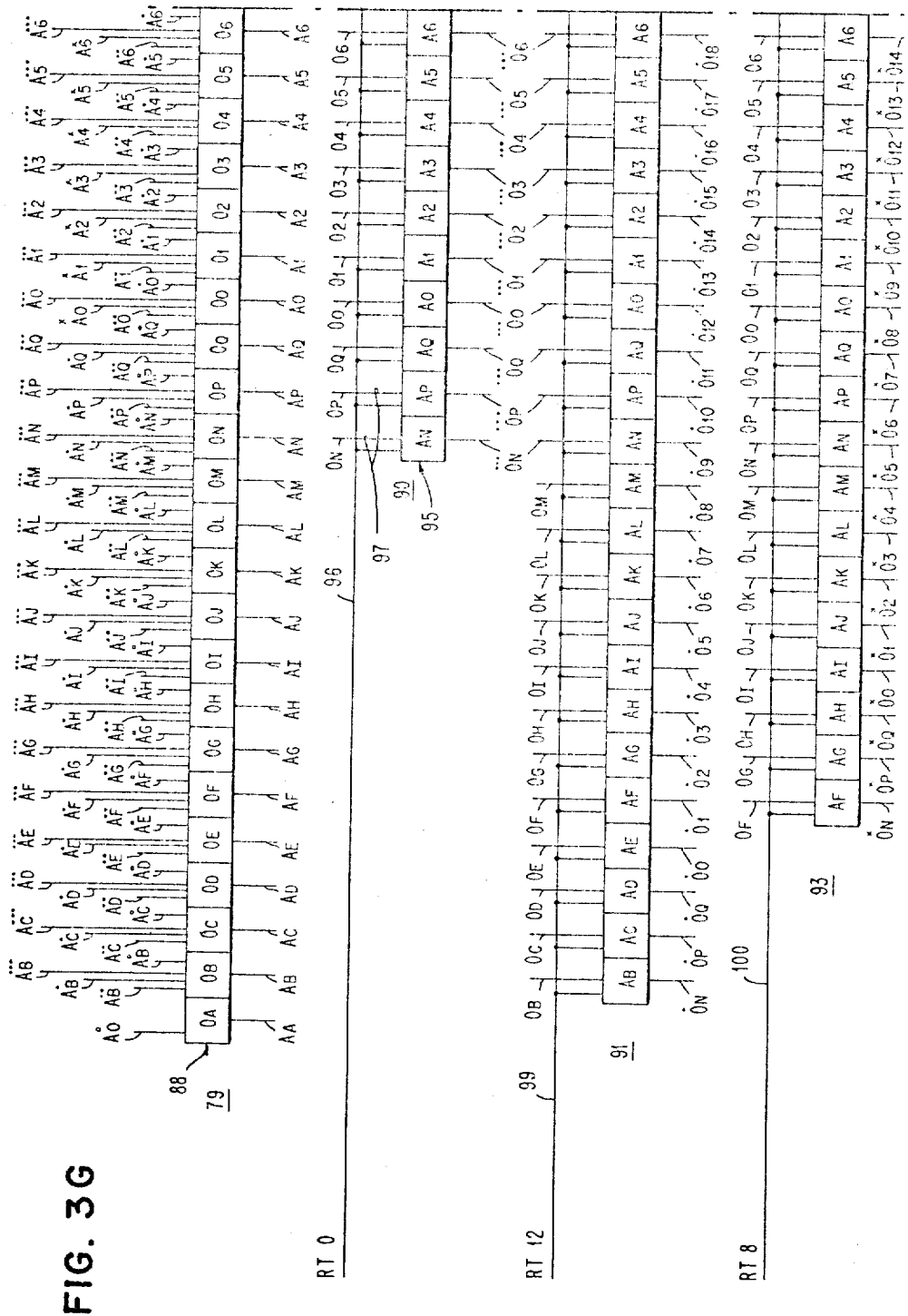
Figure 3H:
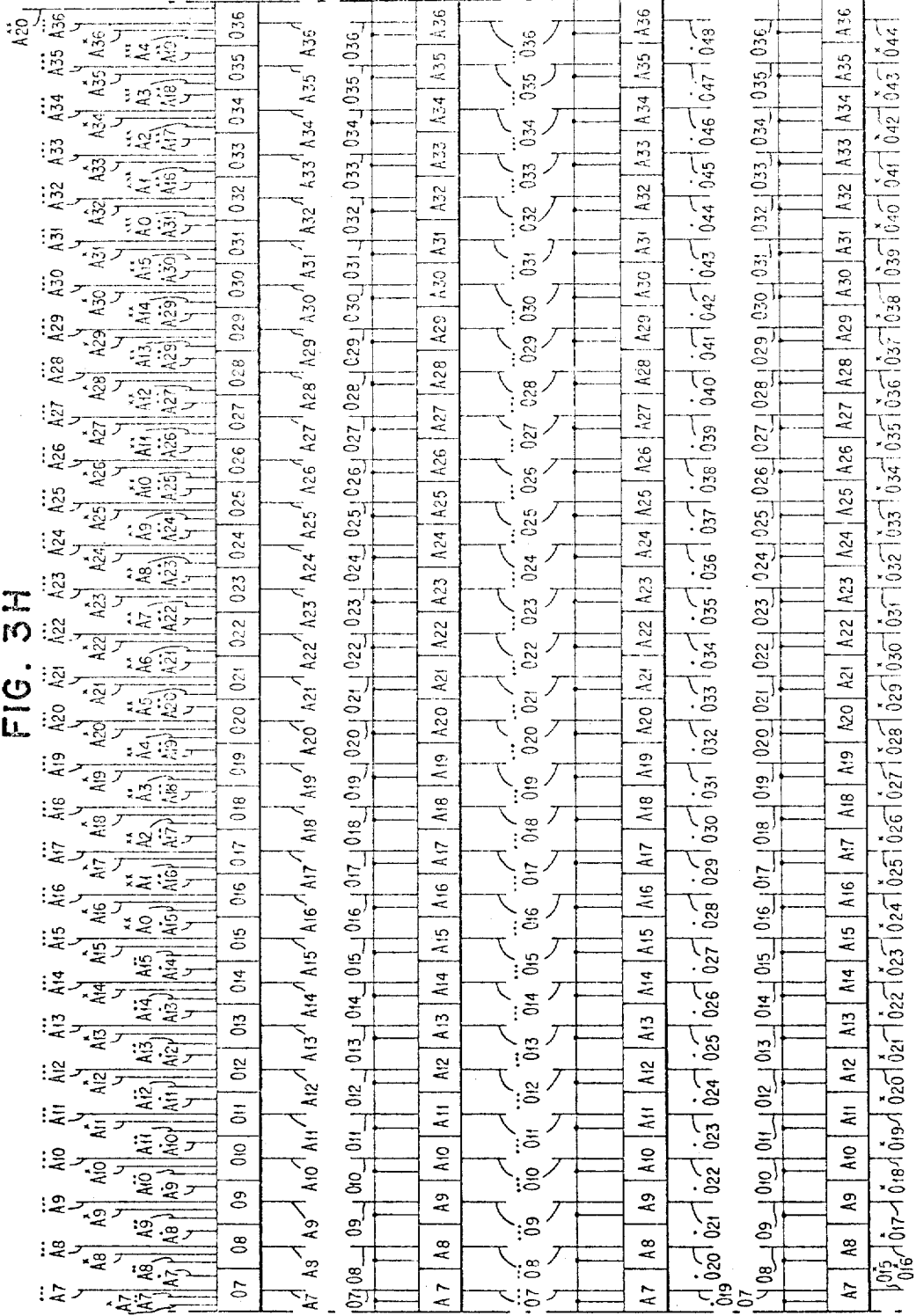
Figure 3I:
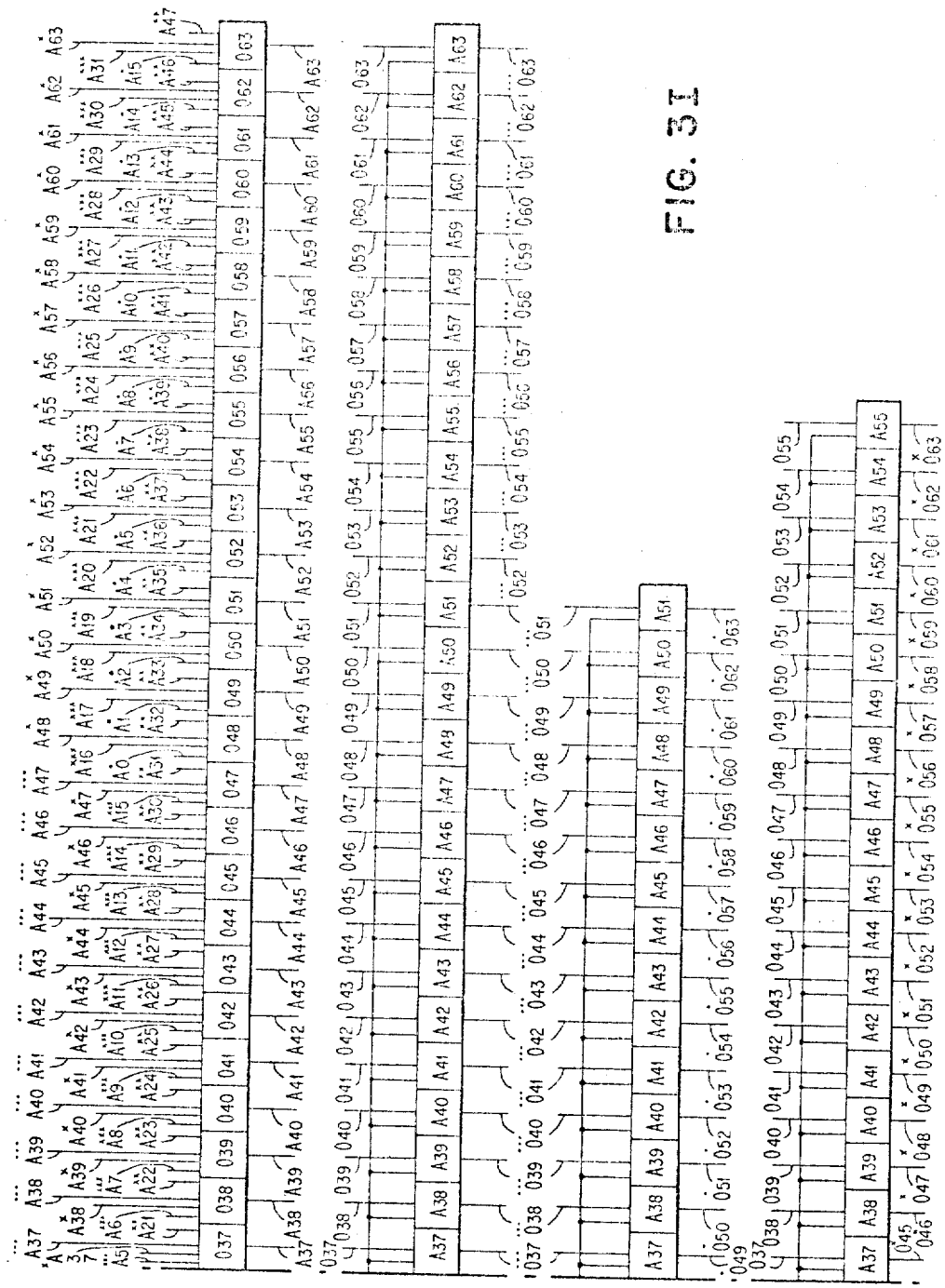
Figure 3L:
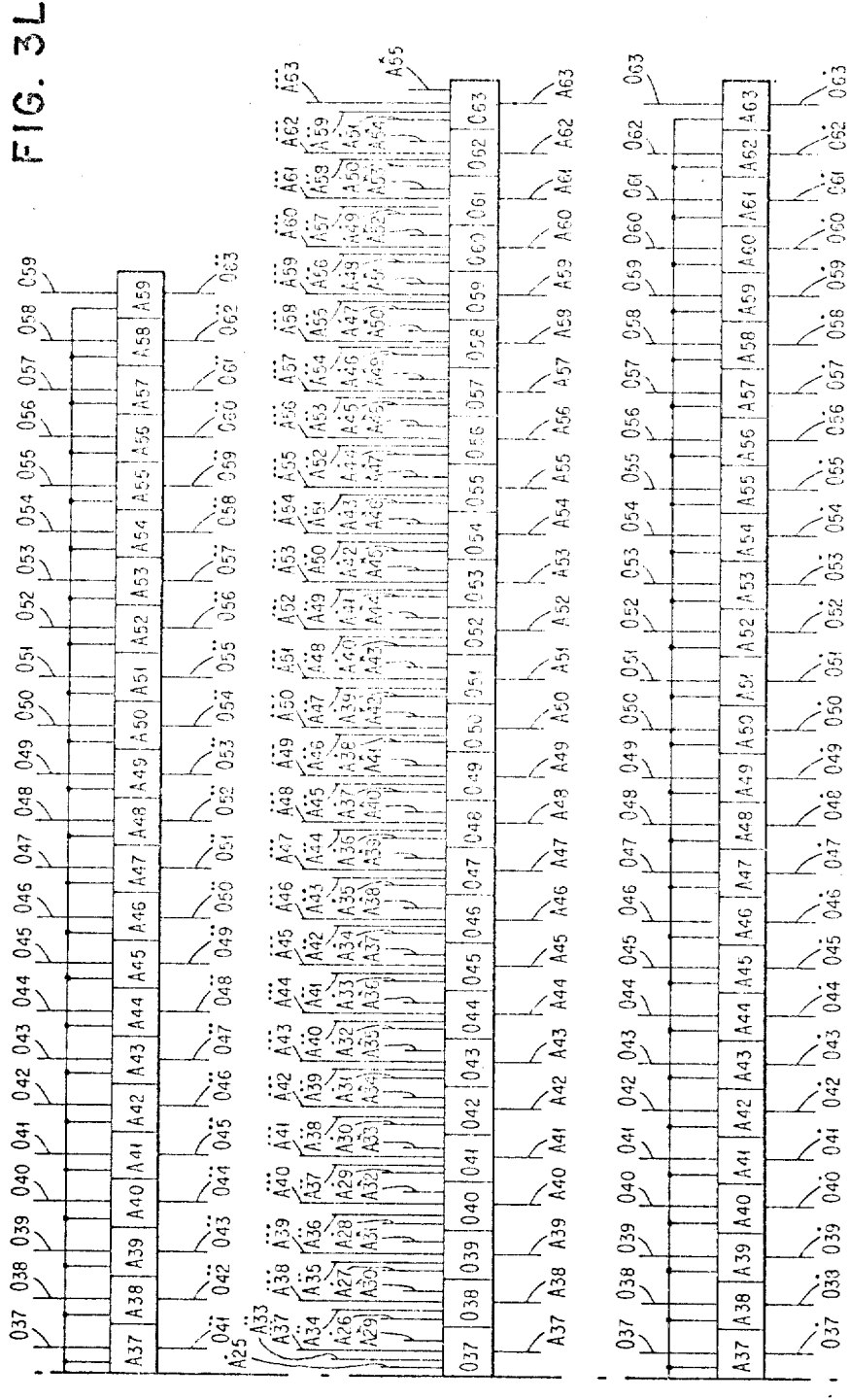
Figure 3M:
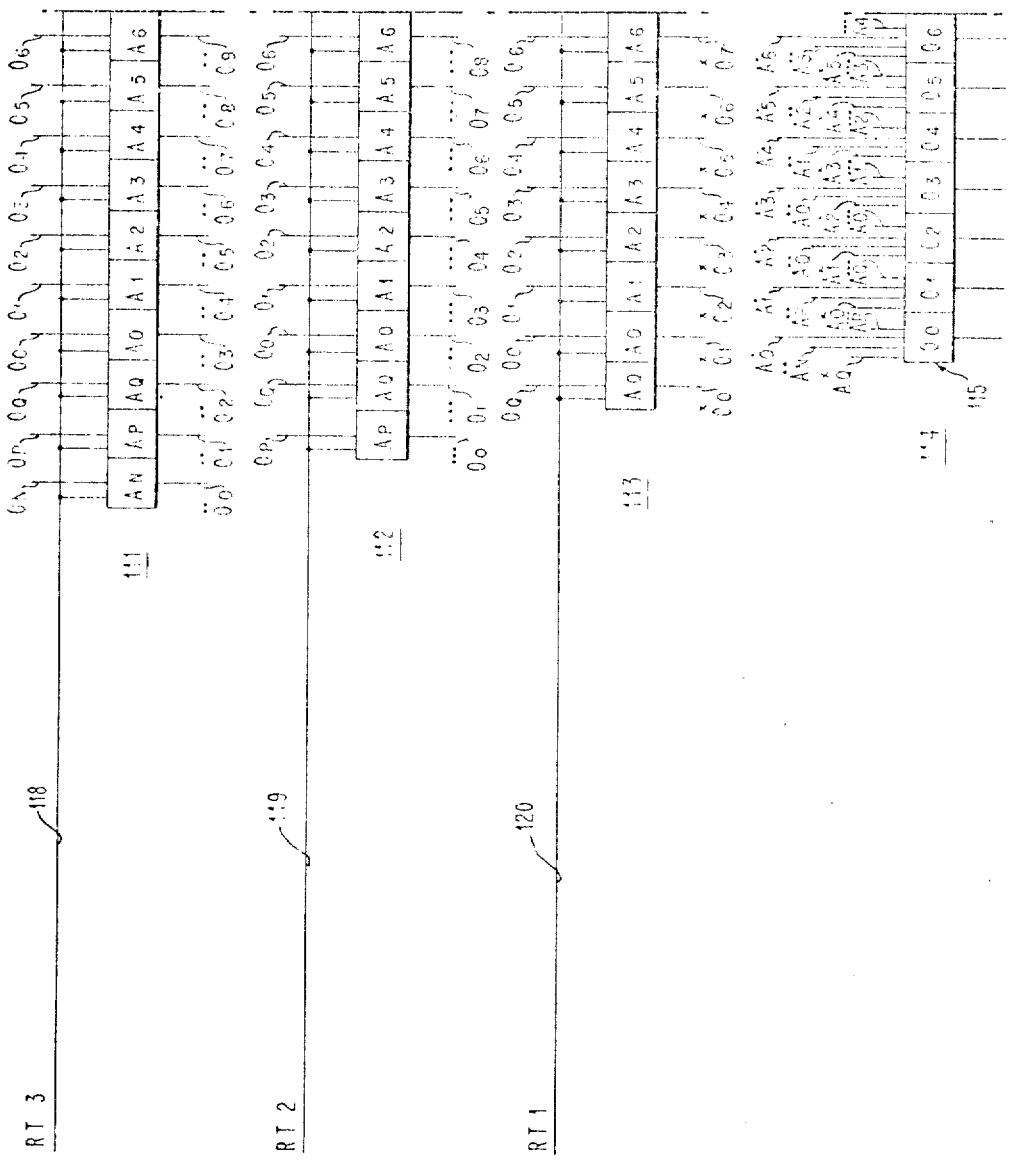
Figure 3N:
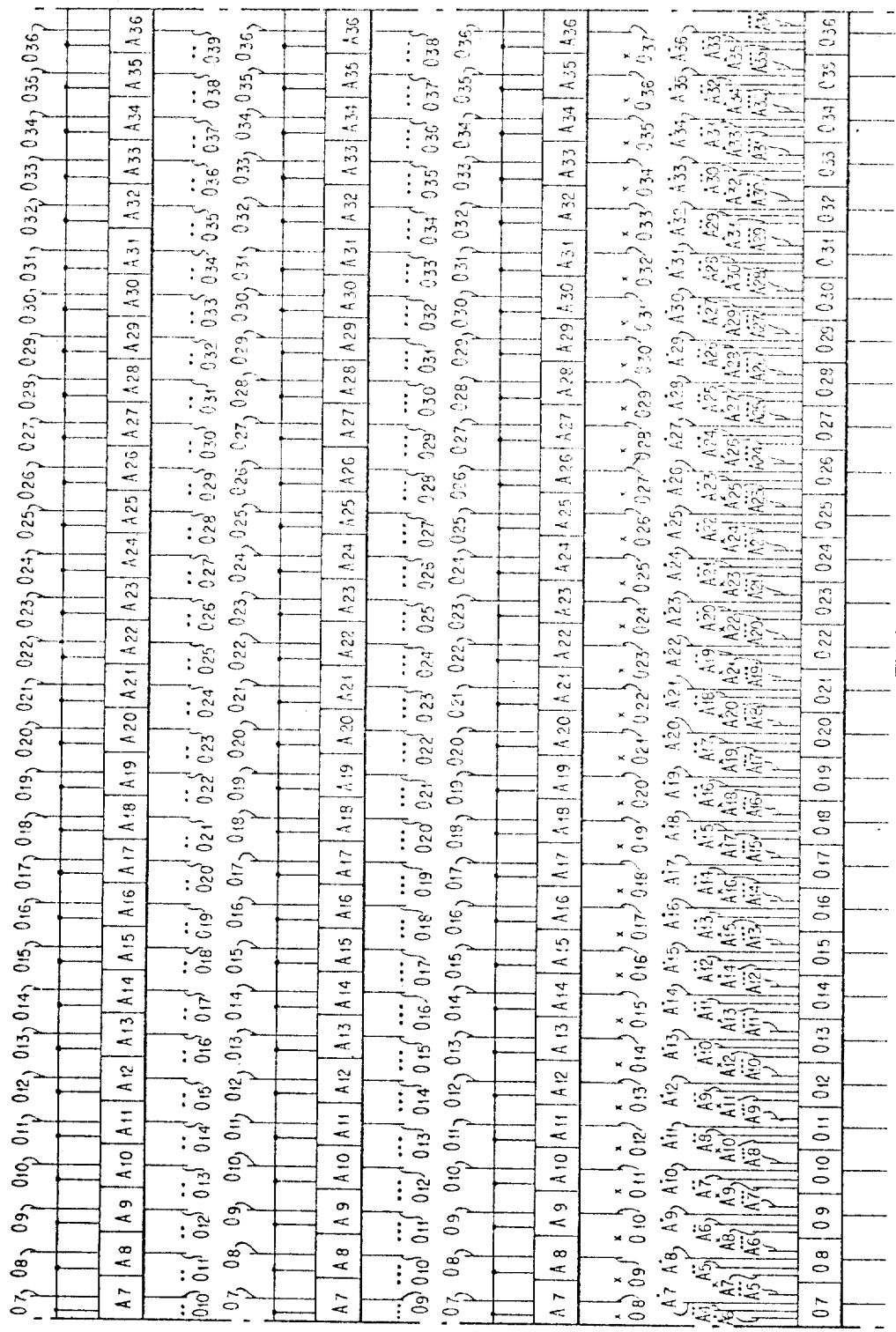

Referring to FIGURE 1 a data transfer device or shifter 20 having 64 storage positions and first, second and third logic levels is connected to a control unit 22 through control line sets 21, 23 and 25. The data transfer device receives as inputs a plurality of set lines 24, reset lines 26 and data input lines 28, one line in each set being connected to a storage position. The shifter provides 64 output lines 50 to a latch 51 or another storage device (not shown). The latch provides output lines 53 which are returned to the data lines 28 of the shifter 20.

The control unit receives as inputs, sets of directional lines 30, 32 and 34 for right, left and ring shifts, respectively, and transfer lines 35 through 49 which carry a five place straight binary code to provide 64 discrete numerical transfer instructions. The control unit has sections 150, 170 and 190 each section being connected through a set of control lines to a logic level in the shifter. The combination of signals on the directional and transfer lines operate the control unit which provides output signals that regulate the transfer of data in the data transfer device 20.

The data transfer device 20, shown in more detail in FIGURES 3A through 3P, includes a plurality of storage registers $R_0$ through $R_{63}$, each of which is responsive to an individual set line 24, reset line 26 and data input line 28. It should be noted that the present invention is not limited to a 64 position storage register but is applicable to any size transfer device. A 64 position transfer device was selected solely for reasons of convenience in explanation.

A typical storage register is shown in more detail in FIGURE 2 and incorporates a plurality of combinatorial logic circuit elements arranged to store information in and clear information from the circuitry. The register comprises a first logical AND circuit 41 adapted to receive the set line 24 and the data line 28 and a second logical AND circuit 42 adapted to receive the reset line 26. The outputs of the AND circuits 41 and 42 are supplied to a logical OR circuit 43 which is connected to a pair of inverter circuits 46 and 48 in series relation. The AND/OR logic circuits are well-known diode arrangements indicated in any text on logic circuitry. The inverter circuits are well-known common emitter amplifiers or like circuit configurations. The output of the inverter circuit 48 is returned to the AND circuit 42 as a second input 49. An output circuit 54 is taken at the series connection between the inverters 46 and 48.

To store information in a register, the set line associated therewith is raised and a data signal is supplied to develop an output from the AND circuit 41. An output signal is provided from the OR circuit 43 which changes the condition of the inverter 46. The output signal provided by inverter 46 appears on the line 54 and is also converted by the inverter 48 to a signal corresponding to that supplied by the reset line to the AND circuit 42. As a result, a signal is supplied to the OR circuit 43 which corresponds to that developed by the AND circuit 41 so that on release of the data signal 28, a stored signal corresponding to the data signal will be retained in the storage register. To clear the register, the reset line is brought down which discontinues the output signal from the AND circuit 42. The signal from the OR circuit 43 changes levels which terminates the output signal. The output signal from the inverter 48 corresponds to the reset signal so that the circuit remains in the condition so long as the reset signal is present. On release of the reset line, the signals to the AND circuit 42 are unlike so the circuit remains in the previously described condition. Storage circuits of the type described are well-known in the art being described for example in a copending application, Serial No. 844,717, filed October 6, 1959, assigned to the present assignee.

The data transfer device 20, shown in FIGURES 3A through 3P, will next be described but for purposes of clarity and lucidness of description a few preliminary remarks are first believed to be in order.

As previously indicated, the data transfer device, as shown in FIGURE 1, has a plurality of storage registers $R_0$ through $R_{63}$, which are connected through first, second and third levels of logic to a plurality of output or data lines 50 coupled to a latch circuit 53 of well-known configuration. Latch circuits are described in the text "Handbook of Semiconductor Devices" by L. P. Hunter, J. P. Wiley Company, 1956, pages 15–52 and in the present invention they serve to control the flow of shifted data to the storage registers $R_0$ through $R_{63}$ or to some new storage location. Each logic level of the shifter receives a particular group of input or control signals from the control unit. The groups of control signals are for different transfers. Logic level 1 receives two subgroups of control lines, one for a left shift direction and the other for a right shift direction. The numerical transfers, however, are the same in both subgroups. The second and third logic levels receive control signals for transfers in a single or right direction only for reasons more apparent hereinafter.

Each logic level is subdivided into a plurality of logic stages, the number of stages in a level corresponding to the number of control lines. Each logic stage comprises a plurality of conventional two input AND circuits, one input being multipled to a preselected control line. The other line to the AND circuits are data lines which originate at preselected storage registers or a data collecting means incorporated into the previous logic levels. The data collecting means is a plurality of conventional OR circuits, each circuit receiving several inputs from particular AND circuits in the various logic stages. The interconnections among the data collecting means and the AND circuits of the logic stages are such that data from the storage register is transferred in accordance with the control lines energized in the various logic levels.

Turning now to FIGURES 3A through 3P, storage registers $R_0$ through $R_{63}$ are shown connected to various logic stages 70 through 77 of the first logic level. Each logic stage, as previously indicated, includes a plurality of AND circuits 78 which are multipled to respective common control lines 80 through 87, the control lines 80 through 87 being multipled to the logic stages 70 through 77, respectively. The AND circuits connected to the control lines 70 through 73 are adapted to shift the data in the storage registers in a right direction 48 positions, 32 positions, 16 positions and 0 positions, respectively. The AND circuits multipled to the control lines 74 through 77 are adapted to shift the data in the storage registers in a left direction 64 positions, 48 positions, 32 positions and 16 positions, respectively. The AND circuits in each logic stage are connected to a data collecting means 79 comprising a plurality of conventional OR circuits 88 designated $O_0$ through $O_{63}$ and $O_a$ through $O_q$ for reasons more apparent hereinafter. The connections among the AND circuits and the OR circuits are made to execute the transfer instruction indicated by the control line to the logic stage. Thus, the logic stage 70 which shifts data right 48 positions connects the storage registers $R_0$ through $R_{15}$ to OR circuits $O_{48}$ through $O_{63}$. Similarly, the logic stages 71 and 72 which shift data right 32 positions and 16 positions, respectively, connect the storage registers $R_0$ through $R_{31}$ and $R_0$ through $R_{47}$ to OR circuits $O_{32}$ through $O_{63}$ and $O_{16}$ through $O_{63}$, respectively. The logic stage 73 which shifts data no positions right or left connects the storage register to the corresponding OR circuit in the data collecting means 79. The logic stages 74 through 77 which shift data left 64 positions, 48 positions, 32 positions and 16 positions, respectively, however, require OR circuits $O_a$ through $O_q$ as well as the OR circuits $O_0$ through $O_{63}$.

For a left shift of 64 positions which the logic stage 74 provides, it is believed apparent that the OR circuits $O_0$ through $O_{64}$ will not suffice, and additional OR circuits must be employed in the logic level. Accordingly, OR circuits $O_a$ through $O_q$ are included in the data collecting means 79 for this purpose. These OR circuits permit the logic stage 74 to connect the storage registers $R_{16}$ through $R_{63}$ to the OR circuits $O_a$ through $O_q$ which shifts the data in the registers left 64 positions.

The left shifts of 48, 32 and 16 positions provided by logic states 75 through 77, respectively, are connected to the OR circuits $O_a$ through $O_q$ as well as $O_0$ through $O_{63}$ since larger quantities of data are handled by these stages than the logic stage 74. The logic stage 75 connects the storage registers $R_{32}$ through $R_{63}$ to the OR circuits $O_b$ through $O_q$ and $O_0$ through $O_{15}$ since sixteen more bits of data are controlled by this stage than the stage 74. Similarly, the logic stages 76 and 77 connect the storage registers $R_{17}$ through $R_{63}$ and $R_1$ through $R_{63}$, respectively, to the OR circuits $O_b$ through $O_q$ and $O_0$ through $O_{31}$ and $O_b$ through $O_q$ and $O_0$ through $O_{47}$, respectively, since 32 and 48 additional bits of data are handled by these stages than the stage 74. Each of the OR circuits 88 receives more than one input signal as a result and the inputs have been related to the output source by identifying symbols for convenience in understanding the structure of the first logic level. Similar identifying marks will be employed in describing logic levels two and three.

Logic level two shown in FIGURES 3A through 3P has logic stages 90 through 93 and data collecting means 94. The logic stage 90 includes a plurality of logical AND circuits designated $A_n$ through $A_q$ and $A_0$ through $A_{63}$. Each logical AND circuits receive as one input a control signal 96 for a data shift of zero positions in the right direction and a second input signal 97 from the OR circuits $O_n$ through $O_q$ and $O_0$ through $O_{63}$ of the data collecting means 79 in first logic level. The number of logical AND circuits in logic stage 90 is less than the number of OR circuits in the data collecting means 79. The second logic stage is limited to handling no more than 67 bits since, as will appear hereinafter, the third level cannot shift data more than three positions in the right direction. The output of the logical AND circuits is supplied to the data collecting means 94 which has a plurality of OR circuits 98 designated $O_n$ through $O_q$ and $O_0$ through $O_{63}$. Since the logic stage 90 shifts the data right zero positions, the output of the logical AND circuits is supplied to the corresponding OR circuits $O_n$ to $O_q$ and $O_0$ through $O_{63}$ in the data collecting means 94.

In like manner logic stages 91 through 93 include a plurality of logical AND circuits, limited in number to 67 for connecting selected OR circuits of the data collecting means 79 to selected OR circuits in the data collecting means 94 in accordance with the control signal to the logic stage. The logic stage 91 which receives control signal 99 for shifting data 12 positions right connects the OR circuits $O_0$ through $O_q$ and $O_0$ through $O_{51}$ of the data collecting means 79 to the OR circuits $O_n$ through $O_q$ and $O_0$ through $O_{63}$ of the data collecting means 94, the transfer of data corresponding to a data shift of 12 positions in the right direction. The logic stage 93 which receives control signal 100 for shifting data 8 positions right connects the OR circuits $O_f$ through $O_q$ and $O_0$ through $O_{55}$ of the data collecting means 79 to the OR circuits $O_n$ through $O_q$ and $O_0$ through $O_{63}$ of the data collecting means 94, the transfer of data corresponding to a data shift of 8 positions in the right direction. The logic stage 92 which receives control signal 101 for shifting data 4 positions right connects the OR circuits $O_j$ through $O_q$ and $O_0$ through $O_{59}$ of the data collecting means 79 to the OR circuits $O_n$ through $O_q$ and $O_0$ through $O_{63}$ of the data collecting means 94, the transfer of data corresponding to a data shift of four positions in the right direction.

Logic level three has logic stages 110 through 113 interconnecting the data collecting means 94 of the second logic level to a data collecting means 114 of the third logic level. The data collecting means of the third logic level has a plurality of OR circuits 115 designated $O_0$ through $O_{63}$ which permits the data arriving at these positions to be returned to the storage registers $R_0$ through $R_{63}$ or to a new storage location not shown. Interconnected between the data collecting means 114 and the storage positions $R_0$ through $R_{63}$ is the latch device 51 (see FIGURE 1) which controls the return of the data signals to the storage registers.

The logic stage 110 has a plurality of logical AND circuits 116 designated $A_0$ through $A_{63}$. Each AND circuit is multipled to a control line 117 which shifts data zero positions right and an input signal from the OR circuits $O_0$ through $O_{63}$ of the data collecting means 94 in the second logic level. Since the logic stage 110 does not shift data in either the right or the left direction, it is believed evident the corresponding AND circuits of the logic stage 110 and OR circuits of the data collecting means 114 are connected together. In like manner the logic stages 111 through 113 are arranged to connect the OR circuits of the data collecting means 94 of the second logic level to the OR circuit of the data collecting means 114 of the third logic level, according to the control line connected to the stage. Thus, the logic stage 111, which receives control line 118 as an input for shifting data three positions right, connects the OR circuits $O_n$ through $O_q$ and $O_0$ through $O_{60}$ of the data collecting means 94 to the OR circuits $O_0$ through $O_{63}$ of the data collecting means 114 of the third logic level, the three position transfer in data corresponding to the control instruction or signal. The logic stage 112, which receives control line 119 as an input for shifting data two positions right, connects the OR circuits $O_p$ through $O_q$ and $O_0$ through $O_{61}$ of the data collecting means 94 to the OR circuits $O_0$ through $O_{63}$ of the data collecting means 114 of the third logic level, the two position transfer in data corresponding to the control signal. The logic stage 113, which receives control line 120 as an input for shifting data one position right, connects the OR circuits $O_q$ and $O_0$ through $O_{62}$ of the data collecting means 94 to the OR circuits $O_0$ through $O_{63}$ of the data collecting means 114 of the third logic level and the one position transfer in data corresponding to the control signal.

Thus, it is believed apparent that data from the storage registers $R_0$ through $R_{63}$ flows through the logic levels in accordance with the control line signals applied thereto, the logic stages being constructed and arranged to shift the data to the next level in accordance with the control signal being applied to the level. The combination of control signals is adapted to execute any instruction input to the control unit as will appear hereinafter.

Figures 4, 4A:
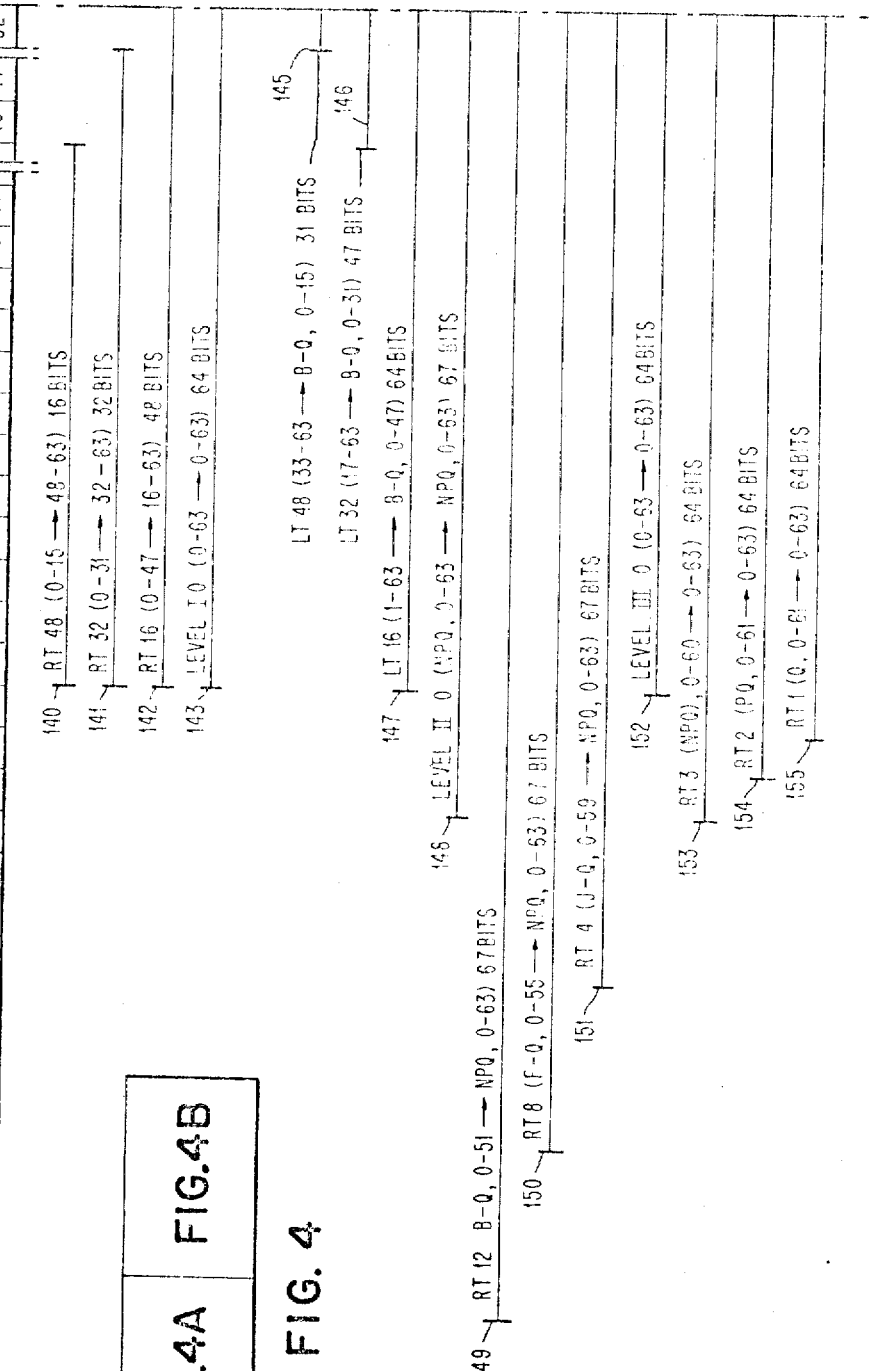
FIGURE 4 is a composite of FIGURES 4A and 4B which are a graphic representation of the data handling abilities of the various logic levels included in the transfer device shown in FIGURE 3.

The interconnection of the storage registers, logic stages and data collecting means described in FIGURE 3 is summarized in FIGURE 4. The storage registers $R_0$ through $R_{63}$ described in FIGURE 3 are represented in FIGURE 4 by squares 130 designated 0 through 63. The squares 130 also correspond to the data collecting means 79, 94 and 114 of the first, second and third logical levels, respectively. A series of squares 131 contiguous with the squares 130 and in line therewith represent the remaining OR circuits designated $O_8$ through $O_9$ of the first and second logical levels. Parallel to the squares are a series of solid lines 140 through 155 corresponding to the logic stages 76 through 77, 90 through 93 and 110 through 113 of the first, second and third logical levels, respectively. Each straight line has indicated thereabove the direction that information is transferred from the storage register or data collecting position; the number of positions shifted; the particular storage positions affected; the destination of the data in the old storage positions and the number of bits of data handled. The logic stages of the first, second and third logic levels are represented by straight lines 140 through 147; 148 through 151 and 152 through 155, respectively. It will be noted the first logic level provides right and left data shifts whereas the second and third logic levels are restricted to a data shift in the right direction only. This feature is of particular importance in the present invention in that the logic circuitry for the device is reduced. The logic circuitry is reduced through arranging the first logic level to overshift data in the left direction and correcting the overshift by the second and third levels performing a shift in the opposite or right direction. This feature simplifies the circuitry of the invention in that each level is not required to shift in both directions to arrive at the desired shift indicated by the input instruction. Further, the right and left feature of the first level permits a ring shift to be performed by the device since both shifts can occur simultaneously.

To operate the data transfer device, it is necessary that a set of signals be provided, one to each logic level, the combination of which transfers the data in accordance with an input instruction comprising a directional signal and a transfer signal. The transfer instruction should define the discrete number of positions that data is to be shifted. Conveniently, this instruction has been found to be best expressed in a straight binary code. Manifestly, the transfer signal could also be expressed in other codes, and the present invention would operate with equal satisfaction. Transfer signals based on the binary code will be described hereinafter, however, for ease of description of the present invention.

The control unit indicated in FIGURE 1 is divided into a first logic section 150, a second logic section 170 and a third logic stage 190. The logic sections each receive as inputs directional lines 30 and 32. The first logic section also receives a ring line input 34. Each logic section also receives as an input one or more transfer lines, the first logic section receiving transfer lines 35 and 36 which carry the two most significant digits of a six digit binary code, the second logic section receiving transfer lines 37 and 38 which carry the third and fourth most significant digits of a six digit binary code and the third logic section receiving transfer lines 39 and 40 which carry the two least significant digits of a six digit binary code. Each logic section also provides a set of output or control lines comprising four or more lines, the output lines of each logic section being connected to the corresponding logic stage of the data transfer device as control lines therefor. The first logic stage provides the control line set 21 which includes the control lines 80 through 87. The second logic section provides the control line set 23 which includes the control lines 90 through 93. The third logic section provides the control line set 25 which includes the control lines 117 through 120.

Before describing the details of each control unit logic section shown in FIGURES 6 and 7, it is believed in order to discuss the logic process of the control unit. Since the data transfer device has first, second and third logic stages, each transfer signal supplied to the control unit is divided into three, two digit binary groups from which are generated three control signals for transmission to the data transfer device. For a right shift instruction, each control signal supplied to the data transfer device has a binary weighting and the arithmetic summation of the binary weightings equals the corresponding arithmetic combination of the binary digits supplied to the control unit. For a left shift, however, the algebraic combination of binary weightings of the control signals combine to correspond to the arithmetic combination of the binary digits supplied to the control unit. The algebraic weighting is based on a left direction as being a plus and a right direction being a minus. The control unit provides an overshifted left transfer signal in the first logic section which is corrected in the second and third logic section. Hence, the arithmetic combination of the control signals will not correspond to the arithmetic combination of the binary signals to the control unit. The feature of overshifting in the left direction simplifies the circuitry of the data transfer device as previously pointed out in connection with FIGURE 3. For a ring shift, the control unit develops in the first logic level a right and left shift signal. The right shift control signals arithmetically equal the binary input signals whereas the left shift control signals algebraically equal the binary input signals.

The logic performed by each logic section is indicated in FIGURE 5. The logic for section one catalogs all possible inputs to the section and the appropriate output produced thereby. It will be noted the right shift control signals comprising lines A through D arithmetically combine those input signals present. Those input signals not present, of course, cannot be included in the summation. The left shift control signals comprising lines E through L are divided into two groups, one group indicating the absence of the four least significant digits and comprising lines E through H and a second group indicating the presence of one or more of the four least significant digits and comprising lines I through L. The first group provides no overshift and the output signal is the arithmetic summation of the input signals present. The four least significant digits are excluded from the summation. No overshift is provided by the first group since the input signals cannot be corrected by any subsequent logic sections due to the absence of any signal thereto. The second group provides overshift since the second and third control signals are present. The output signal is shifted 16 places more than the combination of input signals present, for reasons previously indicated. A ring shift develops two control signals, one appearing in the right or left shift control signals depending upon the direction that a ring shift is desired, and the other developed to shift data in the opposite direction to the shifted direction. The other signal can be considered as the 64's complement of the first signal in a 64 bit system. Thus, when a right ring shift of 48 positions appears, one signal is a right 48 position shift and the other signal is a shift left 16 positions. A left ring shift of 64 position signal produces a shift right zero positions, the two signals combining to provide the correct amount of shift for a ring transfer in the shifter.

The second logic level comprising lines A through L catalogs all possible inputs to the section and the appropriate outputs produced thereby. The second level logic receives left and right shift signals and the third and fourth most significant input digits which affect the output signal. A right shift signal permits the input signals to be arithmetically combined as indicated in lines A through D. A left shift signal corrects in accordance with the presence or absence of the two least significant digits of the binary input signal to the next or third logic level. The absence of the two least significant digits requires the entire correction for the overshift to be performed in the second logic action. Lines E through H indicate the output signals for the absence of the two least significant digits. The first logic level, as previously indicated overshifts 16 places. Since the third and fourth most significant digits of the binary input signals do not total 16, it is necessary to arrive at an equivalent correction by shifting in the opposite direction an amount equal to the 16's complement of the binary input signals. Thus, for an input signal having both the third and fourth significant digits present, as indicated in line E, a right shift of four positions is produced. The right shift of four positions corresponds to a 16 position correction.

The presence of one of the two least significant digits permits the 16 position overshift to be corrected in two steps, one in the second level and the second in the third logic section. The second logic stage can make a correction of 12 positions and the third stage can make a correction of 4 positions. The second and third level corrections are made by 12's and 4's complement shifts of opposite direction to the transfer and directional signals received at the control unit. For the presence of the third and fourth most significant digits, a right shift of zero positions would be developed, as indicated in line I. For the absence of both of these digits, a right shift of 12 positions would be developed, as indicated in line L. The other combinations of input signals would be developed in a similar manner.

The third level logic, indicated in lines N through U, catalogs all possible inputs to the section and the appropriate outputs produced thereby. The third level receives right and left shift signals which affect the output signal. A right shift signal, as indicated in lines N through O, permits the input signals to be arithmetically combined to produce a corresponding output or control signal. A left shift signal, as indicated in lines S through V, corrects the second level output signal by a 4's complement shift in the opposite direction. Thus, the presence of the two least significant digits, as indicated in line S, produces a right shift of one position which is the complement of and corresponds to a correction of 4 positions.

The control signals developed by the first, second and third logic stages appear on the control line sets 21, 23 and 25, respectively, in response to signals on lines 35 through 45 which correspond to the binary input signals and directional signals on the lines 30, 32 and 34 (see FIGURE 1), supplied to the control unit 22.

Turning now to FIGURE 6, the logic circuits for the first level shift control indicated in FIGURE 5, comprises five groups of AND circuits and two groups of OR circuits. One group of AND circuits designated by reference character U, is controlled by the right transfer line 30. A second group of AND circuits designated by the reference character V is controlled by an AND circuit 250 responsive to the absence of signals on transfer lines 211, 213, 215 and 217, the binary complements of the transfer lines 37, 38, 39 and 40. A third group of AND circuits designated by the reference character W is controlled by the left transfer line 32 and the invert of the output from the AND circuit 250, the invert signal originating from a a conventional inverter or common emitter amplifier 252. Each of the AND circuits in the first, second and third group receives a discrete combination of two input signals having a binary weighting of 32 and 16 which appear on transfer lines 35 and 36 and the binary complements thereof which appear on lines 254 and 256. The fourth group of AND circuits designated by reference character X is controlled by the ring line 34. Each AND circuit in the X group also receives as a second input an individual output from one of the AND circuits in the U group. A fifth group of AND circuits designated by the reference character Y is also controlled by the ring line 34 and the left directional line 32. Each AND circuit in the Y group receives as a third input an individual output from the first group of OR circuits designated by the reference character R. Each OR circuit in the R group receives two or more individual inputs, one input from the X group of AND circuits, a second input from the V group of AND circuits and a third input from the W group of AND circuits. The OR circuits provide individual output signals to the left shift control lines 84 through 87 required for the first logic level of the data transfer device. The combination of transfer signals required for these individual output or control signals is indicated in FIGURE 5, lines E through L.

A second group of OR circuits included in the first level logic control and designated by reference character S receives two inputs, one input being from the Y group of AND circuits and the other input being from the U group of AND circuits. The inputs from the S group of OR circuits provide individual control signals to the right shift control lines 80 through 83 for the first logic level of the data transfer device. The combination of input signals to these OR circuits is indicated in FIGURE 5, lines A through D.

FIGURE 7A discloses the logic circuits that perform the second level shift control indicated in FIGURE 5. The second level logic circuits comprise four groups of AND circuits designated J, K, L and M which are connected to OR circuits 260, 262, 264 and 266, respectively. One circuit in each group of AND circuits receives an output from an AND circuit 268 which determines the absence of the two least significant digits from the binary complements of the transfer lines 39 and 40, the lines handling the complements being designated by reference characters 215 and 217. Another circuit in each group of AND circuits receives an output from an OR circuit 270 which determines the presence of one or the other of the two least significant digits. In the event neither of the two least significant digits are present, the second logic level must make the full correction for any overshift that exists in the first logic section. The AND circuit in each group receiving the output from the AND circuit 268 also receives as a second input the left transfer line 32. The other or second AND circuit receiving the output from the OR circuit also receives as a second input the left transfer line 32. A third AND circuit in each group receives neither the output from the AND circuit 268 nor the output from the OR circuit 270, but does receive an input from the right transfer line 30. Each of the AND circuits in the groups also receives two inputs from the third and fourth most significant binary digits which appear on the transfer lines 37 and 38 or the binary complements thereof which appear on lines designated by reference characters 211 and 213. The particular transfer lines to the AND circuit in each group are indicated by the logic statements shown in FIGURE 5, lines A through L, for the second logic section. The combination of lines to a group enables the OR circuit associated therewith to provide individual control signals to the second logic level of the data transfer device, the OR circuits 260, 262, 264 and 266 providing the control lines 96, 101, 100 and 99, respectively.

FIGURE 7B discloses the logic circuits that perform the third level shift control indicated in FIGURE 5. The third level logic circuits comprise two groups of AND circuits designated by reference characters S and T, the former group receiving the right transfer line 30 as an input and the latter group receiving the left transfer line 32 as an input. Each AND circuit in the groups also receives two inputs from the first and second least significant binary digits which appear on the transfer lines 39 and 40, respectively, or the binary complements thereof which appear on lines designated by reference characters 265 and 266, respectively. The particular transfer lines to the AND circuits in each group are indicated by the logic statements shown in FIGURE 5, lines N through V for the third logic section. The third level logic circuitry also includes OR circuits 272, 274, 276 and 278. An S and T AND circuit in each group is connected to one of the four OR circuits. The combination of lines to an OR circuit provides individual control lines 117, 120, 119 and 118 to the third logic level of the data transfer device 20.

Thus, the control 22 provides sets of control lines 21, 23 and 25 to the data transfer device 20. Each set of control lines provides one or more signals which operate an appropriate logic stage of the device 20 to transfer data from the storage register in accordance with the instruction or input signal supplied to the control unit 22. It should be noted that the operation of the data transfer device requires one or more control signals to each logic stage. The absence of a control signal will prevent the operation of the data transfer device. Further, it is not necessary that the logic levels of the device 20 be in the order indicated. The third logic level could be interchanged in position with the first logic level or the second logic level and the operation of the present invention would perform equally as well. The present arrangement of logic levels has been selected solely for reasons of convenience in explanation.

Having described the structure and logical arrangement of the data transfer device 20 and the control unit 22, it is now believed to be in order to describe the operation of the present invention for several different transfer instructions applied successively thereto. FIGURE 8 indicates the transfer instructions supplied as an input to the control unit 22 and the control signals developed as an input to the several logic levels of the data transfer device 20 to execute the corresponding instruction. Each instruction and resulting control signals appear on lines A through D of FIGURE 8A and will be discussed separately in the remaining paragraphs of the application. The instructions right shift 53 positions, left shift 29 positions, right ring shift 19 positions and left ring shift 43 positions, were chosen arbitrarily to indicate the operation of the present invention. It is believed evident that if these instructions operate the invention properly, then any other selected instruction will operate the invention in a corresponding manner.

A right transfer of 53 data positions is indicated by the binary signals appearing on line A of FIGURE 8 the binary signals on the transfer lines 35, 36, 38 and 40 totaling to a decimal value of 53. The directional signal appears on the line 30. The input signals to the control unit develop control signals for a right shift of 48 positions applied to the first logic level; a right shift of four positions applied to the second logic level and a right shift of one position applied to the third logic level of data transfer device 20. The control signals are also indicated on line A of FIGURE 8.

The right shift of 48 positions is developed in the first level shift control indicated in FIGURE 6. The only group of AND circuits energized in the first level shift control is the U group since the right transfer line 30 is up. The other groups of AND circuits, i.e., V, X and Y are not energized due to the left transfer line 32 and the output of the AND circuit 250 being down. The AND circuit 250 is down due to the presence of one or more of the four least significant digits. With the two most significant binary digits appearing on the transfer lines 35 and 36, the AND circuit operated is that connected to the control line 80 through an S group OR circuit. The other AND circuits in the U group are not selected due to the absence of one or more of the required input signals.

The second level shift control is performed by the circuitry indicated in FIGURE 7A. The AND circuit energized in the logic circuitry of FIGURE 7A is that circuit connected to the right directional line 30, the output of the OR circuit 270 and the transfer lines 211 and 38. The only AND circuit that satisfies these conditions is that included in the K group which are all connected to the control line 101 through the OR circuit 262. The other AND circuits in the J, K, L and M groups are not energized due to the absence of one or more of the necessary input signals. The third level shift control is indicated in FIGURE 7B and due to the presence of the right directional signal on the line 30, the S group of AND circuit is activated. The AND circuit connected to the transfer lines 266 and 40 is energized, the transfer lines supply binary signals corresponding to the complement of the binary 2 and the true of the binary 1. The OR circuit 274 provides an output which is coupled to the control line 120 for performing a right shift of one position.

Thus, it appears that the input signals indicated on line A of FIGURE 8 operate the control unit to develop three control signals, i.e., right shift 48 positions, a right shift 4 positions and a right shift 1 position, which are applied to the logic levels 1, 2 and 3, respectively, of the device 20 to transfer data in the storage registers $R_0$ to $R_{63}$ in accordance with the input instruction to the control unit 22. It is assumed, of course, that data has already been set in all the registers $R_0$ through $R_{63}$.

Figure 9:
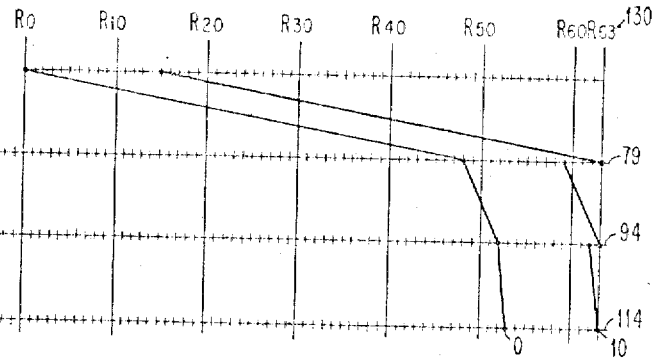
FIGURES 9 through 12 are line diagrams indicating the operation of the device shown in FIGURE 1 in response to the instructions shown in FIGURE 8.
Figure 10:
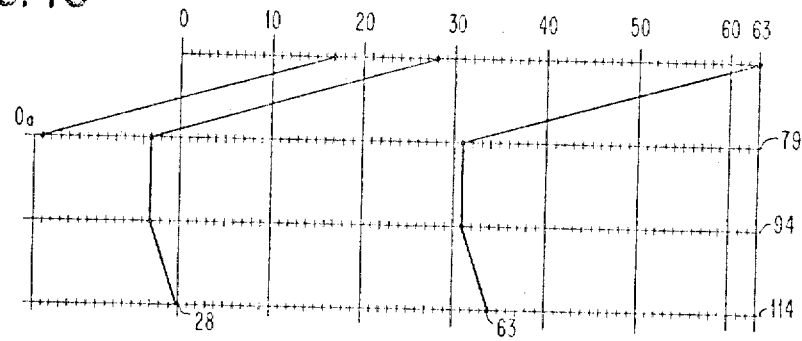
Figure 11:
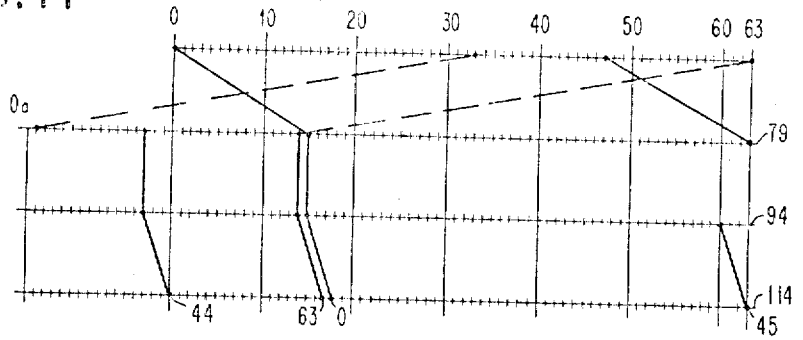
Figure 12:
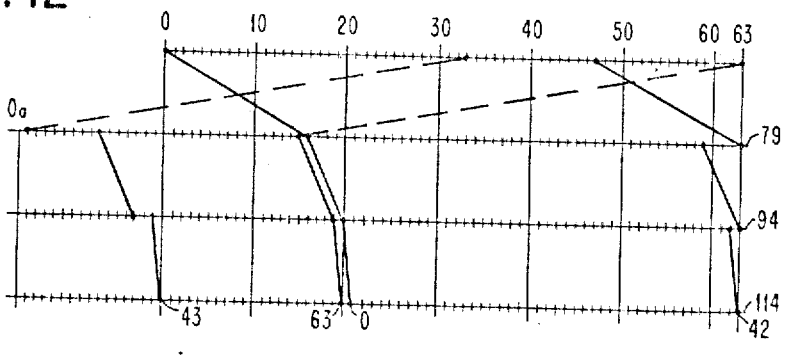

The data transfer device 20, indicated in FIGURES 3A through 3P is operated by the control line 80 to perform a right shift of 48 positions. Accordingly, data is transferred from the storage registers $R_0$ through $R_{15}$ to the OR circuits $O_{48}$ through $O_{63}$ in the data collecting means 79. The remaining data in the storage registers $R_{16}$ through $R_{63}$ is not altered. The second logic level accepts the data from the OR circuits $O_{13}$ through $O_{63}$. The right shift four position signal which appears on the control line 101 transfers the data to the OR circuits $O_{52}$ through $O_{63}$. The third logic level accepts the data in the OR circuits $O_{52}$ through $O_{63}$. The right shift one position signal which appears on the control line 120 transfers the data to OR circuits $O_{53}$ through $O_{63}$ in the data collecting means 114, the data in the OR circuit $O_{63}$ of the data collecting means 94 being lost. The data in the OR circuits $O_{53}$ through $O_{63}$ of the data collecting means 114 is returned to the storage registers $R_{53}$ to $R_{63}$ after reset thereof. Thus, as indicated in FIGURE 9, the data originally stored in the storage registers $R_0$ appear at the OR circuit $O_{53}$ of the means 114 after execution of the input signal to the control unit 22 for a right shift of 53 positions. The data collecting means 79, 94 and 114 are indicated in FIGURE 9 by horizontal lines. The vertical lines intersecting the horizontal lines indicate data position. The slanting lines indicate transfer of data among the data positions. FIGURES 10 through 12 are adapted to convey the same meaning. The dotted lines in FIGURES 11 and 12 indicate simultaneous left transfers in data.

A left transfer of 29 positions is indicated by the binary signals appearing on line b of FIGURE 8, the binary signals on the transfer lines 36, 37, 38 and 40 totaling to a decimal value of 29. The left shift signal appears on the directional line 32. The input signals to control unit develop control signals which provide a left shift of 32 positions; a zero position shift and a right shift of three positions on the control lines 86, 96 and 118 connected to the data transfer device 20. FIGURE 8, row B, also indicates the control signals developed for the instruction supplied as an input to the control unit.

The left shift of 32 positions is developed in first level shift control shown in FIGURE 6. The only group of AND circuits energized in FIGURE 6 is the W group since the transfer signal is present on the line 32. The other groups of AND circuits, i.e., U, V and W are not energized due to the right transfer line 30 and the output of the AND circuit 250 being down. With the absence of the most significant binary digit and the presence of the most significant binary digit appearing on the transfer lines 256 and 36 the AND circuit operated is that connected to the control line 86 through an R group OR circuit. The OR circuit connected to the control line 86 is also connected to an AND circuit in the Y group. None of the AND circuits in the Y group are energized, however, due to the absence of the ring signal on the transfer line 34. Likewise, the other AND circuits in the first level shift control are not operated due to the absence of one or more of the required input signals.

The second left shift control is indicated in FIGURE 7A. The AND circuit energized in the logic circuitry of FIGURE 7A is that circuit connected to the left directional line 32, the output of the OR circuit 270 and the transfer lines 37 and 38. The only AND circuit that satisfies these conditions is that included in the J group which are all connected to the control line 96 through the OR circuit 260. The other AND circuits in the J, K, L and M groups are not energized due to the absence of one or more of the necessary input signals.

The third level shift control is indicated in FIGURE 7B. Due to the presence of the left directional signal on the line 32, the T group of AND circuits is energized. The T AND circuit in this group connected to the transfer lines 266 and 40 provides an output to the OR circuit 275 which operates the control line 118 to provide a right shift of three positions.

Thus, the control unit responds to the input signals to develop three controls, i.e., a left shift 32 positions; a zero position shift and a right shift three positions, which are applied to the logic levels 1, 2 and 3, respectively, of the device 20 to transfer data in the storage registers $R_0$ through $R_{63}$ in accordance with the input instruction to the control unit 22. It will be noted that the control signal applied to the first logic level exceeds the binary weighting of the input signal. The algebraic combination of the control signals for logic levels 1, 2 and 3, however, equals the binary weighting of the input signals. The overshift provided by the first level shift control reduces the hardware necessary to perform the transfer instruction for reasons previously indicated herein.

The data transfer device 20 indicated in FIGURES 3A through 3P is operated by the control line 85 to remove data from the storage registers $R_{17}$ through $R_{63}$ and place the data in the OR circuits $O_b$ through $O_q$ and $O_0$ through $O_{31}$ in the data collecting means 79. The transfer instruction, therefore, overshifts the data in the storage registers by three positions more than required by the input instruction. The second level logic accepts the data in the OR circuits $O_n$ through $O_q$ and $O_0$ through $O_{31}$. The zero position shift signal which appears on the line 96 transfers the data to the corresponding OR circuits in the data collecting means 94. The third level logic accepts the data in the previously indicated OR circuits. The right shift three position signal which appears on the line 118 transfers the data in the OR circuit of the data collecting means 94 to the $O_0$ through $O_{34}$ in the data collecting means 114. Thus, as indicated in FIGURE 10, the data which originally appeared in the storage register $R_{63}$ now appears in the OR circuit $O_0$ of the means 114 after execution of the input instruction supplied to the control unit 22.

A right ring transfer instruction of 19 positions is indicated by the appropriate binary input signals which appear in FIGURE 8, line C, the binary signals on the transfer lines 36, 39 and 40 totaling a decimal value of 19. The directional signals appear on the right transfer line 30 and the ring transfer 34. FIGURE 8, row C, indicates the control signals that are developed by the control unit. It will be noted that a right and left shift signal are developed by the first level shift control and single directional control signals are developed by the second and third level shift controls. The first level shift control develops a right shift of 16 positions and a left shift of 48 positions. The second and third level shift controls develop a zero position shift and a right shift of three positions, respectively.

The right shift 16 position and left shift 48 position signals are developed in first level shift control indicated in FIGURE 6. The only group of AND circuits energized in the first level shift control are the U and Y groups since the right transfer line 30 and the ring transfer line 34 are up. The other AND groups, i.e., V and W, are not energized due to the absence of one or more of the required signals. With the absence and presence of the first and second most significant digits, respectively, which appear on the lines 256 and 36, the U AND circuit selected is that connected to the control line 82 through the OR circuit in the S group. This AND circuit is also connected to an AND circuit in the X group which is coupled to control line 85 through an OR circuit in the R group. This OR circuit in the R group is also connected to an AND circuit in the Y group but which is not energized due to the absence of a signal on the left transfer line 32 which is applied as an input to the Y group of AND circuits. Similarly, all other AND and OR circuits in the first level shift control are not energized due to the absence of one or more input signals thereto. Thus, the first level shift control provides two output signals, one a right shift of 16 positions and the other a left shift of 48 positions.

The second level shift control is performed by the circuitry indicated in FIGURE 7A. The AND circuit energized in the logic circuitry of FIGURE 7A is that circuit connected to the right directional line 30, the output of the OR circuit 270 and the transfer lines 211 and 213. The only AND circuit that satisfies these conditions is that included in the J group connected to the control line 96 through the OR circuit 260. The other AND circuits in the J, K, L and M groups are not energized due to the absence of one or more necessary input signals.

The third level shift control is indicated in FIGURE 7B. Due to the presence of a signal on the right transfer line 30, the S group of AND circuits is energized. The presence of the two least significant digits which appear on the transfer lines 39 and 40 selects the AND circuit in the S group coupled to the control line 118 through the OR circuit 275.

Thus, the control unit responds to the input signals to develop four signals, i.e., a right shift 16 positions, a left shift 48 positions, zero position shift and a right shift three positions. These signals operate the data transfer device to transfer data in the storage registers in right and left directions to perform a ring shift. The summation of the ring shift signals equals the binary weighting of the input signals to the control unit. The left shift signal is the complement of the right shift signal in the first level shift control based on a 64 bit system.

Turning now to FIGURES 3A through 3P, the right shift 16 control signal which appears on the line 82 transfers data from the storage register $R_0$ through $R_{47}$ to the OR circuits $O_{16}$ through $O_{63}$ in the data collecting means 79. Simultaneously, the left shift 48 control signal which appears on the line 83 transfers data in storage registers $R_{33}$ through $R_{63}$ to the OR circuits $O_b$ through $O_q$ and $O_0$ through $O_{15}$ in the data collecting means 79. The storage registers are adapted to supply output signals in two directions simultaneously. The second level logic receives a control signal on the line 96 to perform a right shift of zero position which transfers the information in the OR circuits $O_n$ through $O_q$ and $O_0$ through $O_{63}$ of the data collecting means 79 to the corresponding OR circuits in the data collecting means 94. The third level logic receives a control signal on the line 118 and performs a right shift of three positions so that data in the OR circuits $O_n$ through $O_q$ and $O_0$ through $O_{63}$ of the data collecting means 94 is transferred to the OR circuits $O_0$ through $O_{63}$ in the data collecting means 114. The result of these data transfers, as indicated in FIGURE 11, is that the information originally in the storage register $R_{16}$ now appears in the OR circuit $O_{19}$ and the information in the storage registers $R_{63}$ is in the OR circuit $O_{18}$. Thus, the data in the storage registers has been ring shifted 19 positions.

A left ring shift 43 positions is described by the binary input signals shown in FIGURE 8, line D. The left ring shift instruction appears on the transfer lines 35, 37, 39 and 40. The directional signals appear on the left shift line 30 and the ring shift line 34. The instruction signals operate the control unit to provide a left shift of 48 positions and a right shift of 16 positions as an input to the first logic level of the device 20; a right shift of four positions as an input to the second logic level and a right shift of one position as an input to the third logic level.

The left and ring shift input signals appear on the lines 32 and 34 indicated in FIGURE 6. These signals energize the W and Y groups of AND circuits. The other groups of AND circuit in FIGURE 6 are not energized due to the absence of one or more of the necessary input signals. With the presence and absence of the first and second most significant digits which appear on the lines 35 and 254 the AND circuit in the W group connected to the control line 85 through the OR circuit in the R group is energized. The R OR circuit is also connected to an AND circuit in the Y group which is energized by the directional lines 32 and 34 to provide an output to the control line 82 through the OR circuit in the S group. The second level shift control circuits are shown in FIGURE 7A. The AND circuit energized in the logic circuitry of 7A is that circuit connected to the directional line 32, the output of the OR circuit 270 and the transfer lines 37 and 213. The only AND circuit that satisfies these conditions is that included in the K group which are connected to the control line 101 through the OR circuit 262. Only one circuit in the K group is energized, that circuit being the one connected to the transfer lines 37 and 213. The other AND circuits in the K group are not energized. The third level shift control circuits are indicated in FIGURE 7B. Due to the presence of a signal on the directional line 32, the T group and AND circuits are energized. The AND circuit in the group connected to the transfer lines 39 and 40 is energized. This AND circuit is that connected to the control line 120 through the OR circuit 274, which provides a transfer signal of one position in the right direction.

Thus, the control unit responds to the input signal to develop four control signals, i.e., a left shift 16 positions and right 48 positions to logic level one of the device 20; a right shift four positions to logic level two and right shift one position to logic level three. The combination of these signals transfer the data in the storage registers $R_0$ through $R_{63}$ in right and left directions to execute a left ring shift.

Returning to FIGURE 3, the left shift 48 control signal which appears on the line 85 transfers the information in the storage registers $R_{33}$ through $R_{63}$ to the OR circuits $O_b$ through $O_q$ and $O_0$ through $O_{15}$ in the data collecting means 79. The right shift 16 control signal also applied to the first logic level on the line 82 transfers the data in the storage registers $R_0$ through $R_{47}$ to the OR circuits $O_{16}$ through $O_{63}$ of the data collecting means 79. The second level control signal which appears on the line 101 transfers the data four positions right and as a result, the data in the OR circuit $O_j$ through $O_q$ and $O_0$ through $O_{59}$ is transferred to the OR circuits $O_n$ through $O_q$ and $O_0$ through $O_{63}$ of the data collecting means 94. The third level control signal shifts the data in the previously indicated OR circuits one position to the right. Thus, the information appearing in the storage register $O_q$ and $O_0$ through $O_{61}$ is transferred to the OR circuits $O_0$ through $O_{63}$ of the data collecting means 114. Thus, as indicated in FIGURE 12, the information originally stored in the storage register $R_{43}$ now appears in the OR circuit $O_0$ and the information originally in storage register $R_0$ now appears in the OR circuit $O_{21}$. Thus, the original data has been left ring shift 43 positions.

The present invention is arranged so that the loading on each storage register is equal thereby lowering skew through the present invention and increasing the speed thereof.

The combinatorial logic circuitry is amenable to manufacture by solid circuit techniques, that is incorporating all of the AND circuits of the logic stage in a single semiconductor body. The logic stage, thereafter, can be interconnected by suitable printed circuit techniques so that the entire cost of the apparatus is compact, low in cost and reliable in construction.

The previously indicated construction features together with the versatile left shift, right shift and a ring shift operating characteristics of the present invention will provide a device that will enable large scale data handling systems to be more useful and economically available to the business and scientific communities.

While the invention has been particularly shown and described with reference of a preferred embodiment thereof, it will be understood by those skilled in the art that the foregoing and other changes in form and details may be made therein without departing from the spirit and scope of the invention.

What is claimed is:
1. A data transfer device comprising
   a plurality of storage registers for storing information in assigned register positions,
   a first logic level connected to the storage registers and including a first data collecting means adapted to provide a first output,
   said first logic level responsive to a first control signal to transfer information from the register positions to preselected points in the first data collecting means, said points being displaced in first or second directions or both directions relative to the register positions according to the first control signal,
   a second logic level connected to the first output and including a second data collecting means adapted to provide a second output,
   said second logic level responsive to a second control signal to transfer the information from the first output to preselected points in the second data collecting means, said points in the second data collecting means being displaced in the first direction relative to the points in the first data collecting means according to the second control signal,
   and a third logic level connected to the second output and including a third data collecting means adapted to provide a third output,
   said third logic level responsive to a third control signal to transfer the information from the second output to preselected points in the third data collecting means,
   said points in the third data collecting means being displaced in the first direction relative to the points in the second data collecting means according to the third control signal,
   thereby to transfer the information in the storage register positions to the third output whereby the third output is displaced in a direction and a desired number of positions relative to the register positions according to the sum of the first, second and third control signals.
2. A data transfer device comprising
   a plurality of storage registers for storing information in assigned register positions,
   a first logic level connected to the storage registers and including a first data collecting means adapted to provide a first output,
   said first logic level further including first and second sets of logic stages, each logic stage in a set responsive to a first discrete control signal to transfer information from the register positions to preselected points in the first data collecting means,
   one set of logic stages adapted to transfer the information so as to be left shifted in the first data collecting means relative to the register positions,
   the other set of logic stages adapted to transfer the information so as to be right shifted in the first data collecting means relative to the register positions,
   a second logic level connected to the first output and including a second data collecting means adapted to provide a second output,
   said second logic level further including a plurality of logic stages, each logic stage responsive to a second discrete control signal to transfer the incoming information from the preselected points in the first data collecting means to preselected points in the second data collecting means,
   each logic stage in the second logic level adapted to transfer the incoming information so as to be right shifted in the second data collecting means relative to the preselected points in the first data collecting means, and a third logic level connected to the second output and including a third data collecting means adapted to provide a third output, said third logic level further including a plurality of logic stages, each logic stage in the third logic level responsive to a third discrete control signal to transfer the incoming information so as to be right shifted in the third data collecting means relative to the preselected points in the second data collecting means, thereby to transfer the information in the register positions to the third output so as to be displaced in left or right directions or both any desired number of positions relative to the register positions.

3. A data transfer device comprising a plurality of storage registers for storing information in assigned register positions, a control unit responsive to binary transfer signals and one or more directional signals to provide first, second and third control signals, each control signal providing a directional and shift instruction, a first logic level connected to the storage registers and including a first data collecting means adapted to provide a first output, said first logic level further including first and second sets of logic stages, each logic stage responsive to a first discrete control signal to transfer information from the register positions to preselected points in the first data collecting means, the first set of logic stages adapted to transfer the incoming information so as to be left shifted in the first data collecting means one of a first set of multiples relative to the assigned register positions, the second set of logic stages adapted to transfer the information so as to be right shifted in the first data collecting means one of the first set of multiples relative to the assigned register positions, a second logic level connected to the first output and including a second data collecting means adapted to provide a second output, said second logic level further including a plurality of logic stages, each logic stage responsive to a second discrete control signal to transfer the incoming information so as to be right shifted in the second data collecting means one multiple of a second set of multiples relative to the preselected points in the first data collecting means, and a third logic level connected to the second output and including a third data collecting means adapted to provide a third output, said third logic level further including a plurality of logic stages responsive to a third discrete control signal to transfer the incoming information so as to be right shifted in the third data collecting means a variable size increment relative to the preselected points in the second data collecting means, the combined effect of the discrete control signals transferring the information in the register positions to the third output so as to be displaced a desired number of positions corresponding to the summation of binary transfer signals supplied to the control unit and in a direction according to the directional signal supplied to the control unit.

4. A data transfer device comprising a plurality of storage registers for storing information in assigned register positions, a control unit responsive to binary transfer signals and one or more directional signals to provide first, second and third control signals, the first control signal comprising one or more instruction signals, each control signal comprising a directional and shift instruction, each shift instruction being one of a plurality of multiples, a first logic level connected to the storage registers and including a first data collecting means adapted to provide a first output, said first logic level further including first and second sets of logic stages, each logic stage responsive to a first discrete control signal to transfer information from register positions to preselected points in the first data collecting means, one set of logic stages adapted to transfer the incoming information so as to be left shifted in the first data collecting means one of a first set of multiples relative to the assigned register positions, the other set of logic stages adapted to transfer the information so as to be right shifted in the first data collecting means one of the first set of multiples relative to the assigned register positions, the simultaneous presence of control signals to the one and the other set of logic stages included in the first logic level adapted to ring shift the register information in the first data collecting means, the ring shifted information being displaced a multiple relative to the assigned register information according to the transfer signal supplied to the control unit and in a direction according to the directional signal supplied to the control unit, a second logic level connected to the first output and including a second data collecting means adapted to provide a second output, said second logic level further including a plurality of logic stages, each logic stage responsive to a second discrete control signal to transfer the incoming information from the preselected points in the first data collecting means to preselected points in the second data collecting means, each logic stage in the second logic level adapted to transfer the incoming information so as to be right shifted in the second data collecting means relative to the preselected points in the first data collecting means, and a third logic level connected to the second output and including a third data collecting means adapted to provide a third output, said third logic level further including a plurality of logic stages, each logic stage responsive to a third discrete control signal to transfer the incoming information from the preselected points in the second data collecting means to preselected points in the third data collecting means, each logic stage in the third logic level adapted to transfer the incoming information so as to be right shifted in the third data collecting means relative to the preselected points in the second data collecting means, thereby to transfer the information in the register positions to the third output so as to be ring shifted or right-left shifted according to the directional signals supplied to the control unit and a desired number of positions relative to the register positions according to the binary transfer signals supplied to the control unit.

5. A data transfer device comprising a plurality of storage registers for storing information in assigned register positions, a control unit responsive to transfer signals and one or more directional signals to provide first, second and third control signals, each control signal providing a left or right directional and shift instruction, a first logic level connected to the storage registers and including a first data collecting means adapted to provide a first output, said first logic level responsive to the first control signal to transfer information from the register positions to preselected points in the first data collecting means according to the first control signal, a left shift directional signal to the control unit producing a left shift instruction to the first logic level to overshift the transfer of information to the preselected points relative to the register positions, a second logic level connected to the first output and including a second data collecting means adapted to provide a second output, said second logic level responsive to the second control signal to transfer the information at the first output to preselected points in the second data collecting means, said second logic level adapted to correct the overshift in the first logic level a predetermined amount according to the second control signal, and a third logic level connected to the third output and including a third collecting means adapted to provide a third output, said third logic level responsive to the third control signal to transfer the information at the second output to preselected points in the third data collecting means, said third logic level being further adapted to correct any remaining overshift of data in the first logic level according to the third control signal, thereby to execute the binary transfer and directional signals supplied to the control unit and transfer the information in the register positions to the third output so as to be displaced a discrete number of positions and in a preselected direction relative to the register positions according to the directional signal.

6. A data shifting device comprising a plurality of storage registers for storing information in assigned registers and providing an output, a control unit responsive to directional and shift signals to provide a plurality of control signals as outputs, a plurality of logic levels connected in series and to the output of the storage registers, and an output circuit, each logic level responsive to a control signal to control the flow of information in different variable increments from the registers to the output circuit, the control signals adapted to right, left or ring shift the information in the output circuit any desired number of positions relative to the storage register positions.

7. A data shifting device comprising a plurality of storage registers for storing information in assigned registers and providing an output, a plurality of logic levels connected in series and to the output of the storage registers, an output circuit, and a control unit responsive to binary input signals and a directional signal to provide a plurality of control signals, each logic level responsive to a control signal to shift the information from the registers to the output circuit a different variable number of positions and in a first or second direction or both relative to the storage register positions, one control signal adapted to direct the flow of information to the output circuit so as to be beyond the number of positions indicated by the binary input signals, the other control signals adapted to return the flow of information to the output circuit so as to execute the binary input and directional signals supplied to the control unit.

8. Electronic data shifting apparatus for bidirectionally shifting data in variable sized increments comprising in combination a source of input data signals;

means for providing simultaneous control signals representing the amount and direction of data shift;

means jointly responsive to said control signals and to said input data signals for shifting said input data signals in increments of a first size in one direction;

means for accepting the shifted input data signals and for providing first output signals; and means jointly responsive to said control signals and to said first output signals for shifting said first output signals in increments of a second size in a direction opposite to said one direction and for providing second output signals, said second output signals comprising a shifted representation of said input data signals.

9. The electronic data shifting apparatus defined in claim 8 further including.

means, jointly responsive to said control signals and said second output signals, for shifting said second output signals in increments of a third size and in the direction opposite to said one direction.

10. Electronic data shifting apparatus comprising a source of input data signals;

a control unit responsive to shift signals which designate the direction and extent of shift desired for the input data signals, said control unit developing coarse, medium and fine control signals, and first, second and third logic levels, said first logic level responsive to the input data signals and the coarse control signal to provide a first output signal;

the second logic level responsive to the first output signal and the medium control signal to provide a second output signal;

the third logic level responsive to the second output signal and the fine control signal to provide a third output signal;

said third output signal shifted in direction and extent of shift relative to the input data signals according to the shift signals.

11. The electronic shifting apparatus defined in claim 10 wherein the control unit provides coarse control signals for bidirectional shifting of the input data signals.

12. The electronic shifting apparatus defined in claim 11 wherein the medium and fine control signals provide unidirectional shifting of the first and second output signals, respectively.

13. The electronic shifting apparatus defined in claim 10 wherein the summation of the coarse, medium and fine control signals corresponds to the shift signal supplied to the control unit.

14. The electronic shifting apparatus defined in claim 11 wherein the coarse control signals initiate right shift or left shift or ring shift of the input data supplied to the first logic level, the medium and fine control signals initiate right shift of the second and third output signals, respectively, the left shift signals in the first logic level being offset by the right shift signals in the second and third logic levels.

References Cited by the Examiner
UNITED STATES PATENTS

| | | | |
|---|---|---|---|
| 2,844,310 | 7/1958 | Cartwright | 235—61 |
| 3,061,192 | 10/1962 | Terzian | 235—157 |
| 3,129,411 | 4/1964 | Albrecht | 340—174 |

ROBERT C. BAILEY, *Primary Examiner.*

R. M. RICKERT, *Assistant Examiner.*